United States Patent
Grimshaw et al.

(10) Patent No.: US 11,913,765 B2
(45) Date of Patent: Feb. 27, 2024

(54) JETTISON AND ARMING SYSTEM

(71) Applicant: BAE Systems plc, London (GB)

(72) Inventors: William Henry Grimshaw, Preston (GB); Ronald Henry James Ingram, Preston (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 18/263,769

(22) PCT Filed: Jan. 28, 2022

(86) PCT No.: PCT/GB2022/050224
§ 371 (c)(1),
(2) Date: Aug. 1, 2023

(87) PCT Pub. No.: WO2022/167780
PCT Pub. Date: Aug. 11, 2022

(65) Prior Publication Data
US 2024/0035793 A1    Feb. 1, 2024

(30) Foreign Application Priority Data

Feb. 2, 2021  (EP) .................................. 21275010
Feb. 2, 2021  (GB) .................................. 2101418

(51) Int. Cl.
*F42C 15/40*    (2006.01)
*F42C 15/44*    (2006.01)
*B64D 1/06*    (2006.01)

(52) U.S. Cl.
CPC ............ *F42C 15/44* (2013.01); *B64D 1/06* (2013.01); *F42C 15/40* (2013.01)

(58) Field of Classification Search
CPC .......... F42C 15/00; F42C 15/40; F42C 14/06; B64D 1/04; B64D 1/06
See application file for complete search history.

(56) References Cited

U.S. PATENT DOCUMENTS 2,341,457 A  *  2/1944  Markey ................ B64D 1/04
                                                    89/1.51
3,326,083 A  *  6/1967  Johnson .................. F42C 14/06
                                                    89/1.51
(Continued)

FOREIGN PATENT DOCUMENTS

| EP | 1544103 A1 | 6/2005 |
| GB | 2586061 A | 2/2021 |
| RU | 2720076 C1 | 4/2020 |

OTHER PUBLICATIONS

EP Search Report for Application No. 21275009.5 dated Jul. 28, 2021 11 pages.
(Continued)

*Primary Examiner* — Joshua E Freeman
(74) *Attorney, Agent, or Firm* — Maine Cernota & Curran

(57) ABSTRACT

There is provided an arming apparatus for a store, the apparatus comprising: a first attachment system and a second attachment system; a linking connector coupled with the first attachment system and the second attachment system; and an arming clip; wherein each of the first attachment system and the second attachment system comprises: a first frangible connector coupled with the arming unit and the linking connector; and a second frangible connector coupled with the linking connector and the store. The linking connector is coupled to the first attachment system via a first coupling arrangement and is coupled to the second attachment system via a second coupling arrangement, wherein the first coupling arrangement and the second coupling arrangement are different. Each of the first coupling arrangement and the second coupling arrangement are manually secure.

15 Claims, 17 Drawing Sheets

(56) References Cited

U.S. PATENT DOCUMENTS

| | | | | |
|---|---|---|---|---|
| 3,575,084 | A * | 4/1971 | Glendenning | F42B 10/14 89/1.55 |
| 3,625,106 | A * | 12/1971 | Russo et al. | F42B 10/56 89/1.55 |
| 3,703,844 | A * | 11/1972 | Bleikamp, Jr. | B64D 1/06 89/1.55 |
| 3,712,169 | A * | 1/1973 | Koff | B64D 1/06 89/1.55 |
| 3,956,964 | A * | 5/1976 | McGuire | B64D 1/04 89/1.55 |
| 3,983,784 | A * | 10/1976 | Maughlin | B64D 1/04 89/1.55 |
| 4,348,936 | A * | 9/1982 | Fulchiron | F42C 14/06 89/1.55 |
| 4,567,809 | A * | 2/1986 | Van Sloun | F42C 15/20 102/221 |
| 4,882,970 | A * | 11/1989 | Kovar | F42C 14/08 89/1.55 |
| 5,085,507 | A | 2/1992 | Williams | |
| 5,227,985 | A | 7/1993 | Dementhon | |
| 11,472,551 | B2 * | 10/2022 | Murray | F41F 3/06 |
| 2011/0079703 | A1 | 4/2011 | Gunning, III | |
| 2012/0291613 | A1 * | 11/2012 | Rastegar | F42B 25/00 89/1.54 |
| 2022/0267003 | A1 * | 8/2022 | Murray | F42B 25/00 |

OTHER PUBLICATIONS

GB Search Report for Application No. 2101411.3 dated Jun. 22, 2021, 3 pages.
International Search Report and Written Opinion for Application No. PCT/GB2022/050220 dated May 4, 2022, 17 pages.
EP Search Report for Application No. 21275010.3 dated Jul. 28, 2021 12 pages.
GB Search Report for Application No. 2018167.3 dated Nov. 21, 2022, 10 pages.
International Search Report and Written Opinion for Application No. PCT/GB2022/050224 dated Jan. 28, 2022, 15 pages.

* cited by examiner

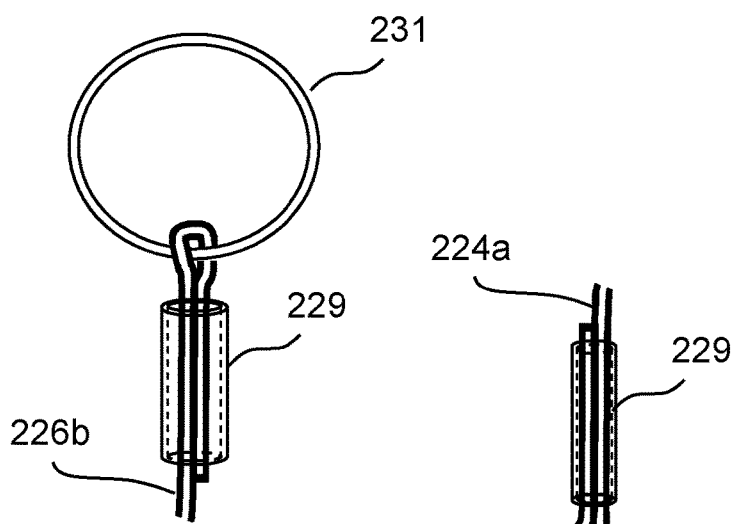
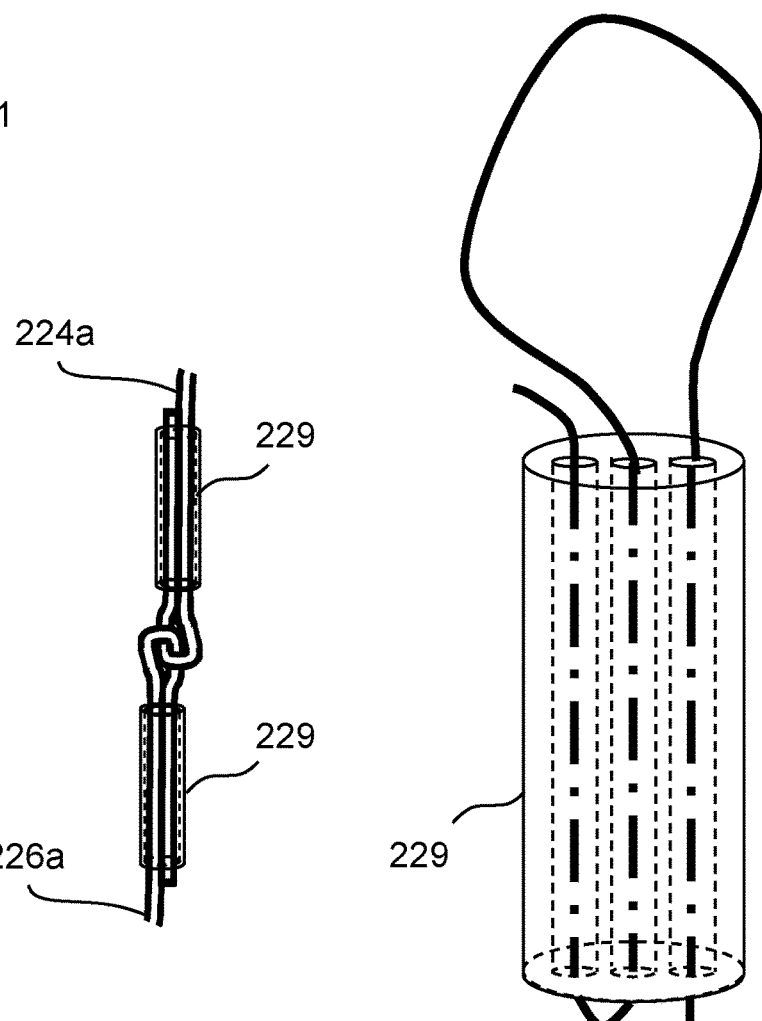
Figure 2c
Figure 2e
Figure 2d
Figure 2f

JETTISON AND ARMING SYSTEM

RELATED APPLICATIONS

This application is a national phase application filed under 35 USC § 371 of PCT Application No. PCT/GB2022/050224 with an International filing date of Jan. 28, 2022, which claims priority of GB Patent Application 2101418.8 filed Feb. 2, 2021 and EP Patent Application 21275010.3 filed Feb. 2, 2021. Each of these applications is herein incorporated by reference, in its entirety, for all purposes.

FIELD OF THE INVENTION

The present invention relates generally to an arming apparatus, and more particularly for an arming apparatus for use with a store, such as a munitions projectile.

BACKGROUND OF THE INVENTION

Ejector release units are typically installed on aircraft pylons or aircraft internal bays and are used for the carriage and release of stores, such as munitions projectiles. The store may be carried on the ejector release unit by means of two suspension hooks engaging with two store mounted suspension lugs. The ejector release unit may comprise a cartridge operated device or a pressurised gas device. When the ejector release unit is fired or operated, it opens the suspension hooks and operates pistons within the ejector release unit which effectively "pushes" the store away from the aircraft to ensure it does not collide with the aircraft structure on release. Other coupling mechanisms to suspension hooks may be used in practice, for example, the store may rest on a selectively collapsible ledge.

Certain fuze (sometimes referred to as "fuse") systems for stores, may have a combination of electrical and mechanical inputs (i.e. a first and second fuze input respectively) required for activation. Typically, and for reasons of safety, electrical power is not normally available within the fuze system prior to the release of the store and so power must be supplied from the aircraft during release or generated by the store after release.

In one example, the supply of electric power is achieved via inductive transfer of energy from outside of the fuze system and outside of the store to the fuze system within the store. Alternatively, hard-wired connections might be used for the transfer of power, for example in the form of plug and socket like arrangements, or contact pins, and so on. In one example, the fuze system includes a deployable wind turbine that is operable to generate electricity via the turning of the wind turbine rotors to generate electricity and activate the electrical input of the fuze system.

The wind turbine is designed to be deployed during the release of the store. However, it is challenging to ensure that the wind turbine is deployed by a lanyard at an acceptable angle. If the wind turbine is deployed outside of acceptable parameters, then it will not operate correctly and could be damaged. Existing solutions require long lengths of lanyards to achieve this.

In addition, to ensure that lanyards are released with the store after they are operated, additional retaining wires are required, which leads to increased complexity. These additional wires and arming connectors need to be routed and secured correctly to ensure that they operate correctly. In order to do this, tape that remains secure during high speed carriage, such as speed tape, is often required to secure the arming connectors and additional wires to the store. There is a risk that the speed tape may peel and be removed during flight or after the release of the store, which may mean that the wires fail to operate as designed.

The fuze system enables the store to be carried on the aircraft in a safe condition. The store can be released in two ways, namely a jettison release in which the store is released in an unarmed condition and a live release in which the store is released in an activated condition and becomes armed when it reaches a safe distance away from the aircraft. A store is usually jettisoned in an emergency, for example in a situation where an aircraft needs to reduce weight and aerodynamic drag. In this case the store is released, but the fuze system does not arm the munitions projectile, and the store will hit the ground but will not explode.

An alternative to a jettison release is a live release. In a live release, the fuze system is activated on release of the store. The fuze system arms the store at a safe distance from the launch aircraft to enable the store to explode at the required time.

In some examples, the store is activated by one or two electromagnetically operated, arming units. These are usually mounted at either end of the ejector release unit. In some examples, an additional electrical arming input is provided. In existing systems, there is a risk that during a jettison event, if one of the arming units fails, then the store will be released in an activated state.

SUMMARY OF THE INVENTION

It is an aim of example embodiments of the present invention to at least partially reduce or avoid one or more disadvantages of the prior art, discussed above or elsewhere, or to at least provide a viable alternative to existing arming apparatus.

In a first example, there is provided an arming apparatus for a store, the apparatus comprising: a first attachment system and a second attachment system; a linking connector coupled with the first attachment system and the second attachment system; and an arming clip coupled with the linking connector and for coupling with an arming connector of a first fuze input of the store; wherein each of the first attachment system and the second attachment system comprises: an attachment for an arming unit; a first frangible connector coupled with the arming unit and the linking connector; and a second frangible connector coupled with the linking connector and said store. The linking connector is coupled to the first attachment system via a first coupling arrangement and is coupled to the second attachment system via a second coupling arrangement, wherein the first coupling arrangement and the second coupling arrangement have different structural configurations, and wherein each of the first coupling arrangement and the second coupling arrangement are manually secure.

Providing different coupling arrangements means that a user can readily identify the orientation of the arming apparatus during installation. Further, the apparatus may be delivered to a technician in assembled form. In other words, the apparatus may be provided as a self-contained piece of equipment that a technician can easily install onto a store for connection into the aircraft. This arrangement means that the arming apparatus may be easily attached to a store during installation, and easily detached from said store after a flight if the store was not released during flight. That is to say that the arming apparatus may be self-contained and reused for connection with other stores in future.

The provision of this arming apparatus can remove the need for excessively long lengths of arming wires and lanyards, which could become trapped and damaged during installation or operated by aerodynamic forces during flight or inadvertently operated by ground crew during store preparation or weapon loading. Further, the requirement for speed tape is significantly reduced. The simplified cable routing allows for rapid assembly and it reduces the chance of operator errors. Further, the fusing system can be premade away from the aircraft in a controlled factory environment to specified procedures and tolerances thus reducing the possibility of end user lanyard system assembly/installation errors. The arming apparatus is configured such that all the connectors fall away with the store during a release. The arming apparatus also provides a system in which two arming units are both required to be activated in order for a live release of a store. The arming apparatus is configured to connect to the arming units via an attachment. In some examples, the attachment comprises a loop or a ring or a coupler to connect the arming apparatus to the arming units. Further, the apparatus provides an indication of what event has occurred, e.g, whether the store has been released as a live release, a jettison or a failed jettison event. When a store is released as a live release, the top portion of both of the first shear wires is retained in the arming units.

In contrast, in the event of a correct jettison event, both of the first shear wires are released in their entirety together with the store. In the event of a failed jettison event, which would indicate that one of the arming units has not operated correctly, then in a post flight check, one of the top portion of the first shear wires would have been retained in a respective arming unit. Further, the apparatus enables a wind turbine lid of a first input to be opened within the correct range of operating angles during a live release.

Further, this arrangement means that the arming apparatus may be easily attached to a store during installation, and easily detached from said store after a flight if the store was not released during flight. That is to say that the arming apparatus may be self-contained and reused for connection with other stores in future.

In one example, the second frangible connector comprises a clip at the second end, wherein the clip is configured to pass through or loop through a lug of the store and couple with the second frangible connector between the first end and the second end. The clip may comprise a hook with a manually actuatable member for selectively enclosing a further member. The clip may comprise a carabiner clip, a Maillon or a shackle. The clip may have the form of a wire bent back on itself and biased so that the overlapping portions are urged into contact with one another.

In one example, the second end of the second frangible connector is crimped together with a region of the second frangible connector between the first end and the second end of the second frangible connector.

In the first coupling arrangement, the linking connector may be directly coupled to the first attachment system.

In the second coupling arrangement, the linking connector may be coupled to the second attachment system via an intermediate coupler.

The intermediate coupler may comprise an intermediate ring.

The presence of the intermediate ring between the linking connector and the second attachment system enables an operator to easily identify the correct orientation of the arming system and so reduces the risk of installation errors.

In one example, the gag rod wire coupled with the store and a second fuze input via the second attachment system. The gag rod wire provides a safety interlock during store carriage and a second input to the fuze system during live release. In alternative examples, the gag rod wire and the second input to the fuze system may be absent altogether.

Each attachment system may comprise a safety connector coupled with the linking connector and the store. The safety connector ensures that components of the first attachment system and the second attachment system fall away with the store.

The length of the safety connector may be longer than the length of the arming connector.

One or more of the first frangible connector and the second frangible connector may comprise a shear wire.

The first frangible connector may have a higher breaking force compared with the breaking force of the second frangible connector. The first frangible connector may have a breaking force of between approximately 700N and 1000N.

The second frangible connector may have a breaking force of between approximately 100N and 200N.

The arming unit may comprise an arming solenoid, wherein the arming solenoid has a first attachment force for the first frangible connector when the arming unit is energised and a second attachment force for the first frangible connector when the arming unit solenoid is unenergised. The arming unit may comprise a ferromagnetic bolt which is mechanically biased (with a spring) to urge closed a gate (e.g. a ball bearing) partially occluding a channel. Under the mechanical biasing, the gate can be opened by forces above a first threshold (the first attachment force). The arming unit may also comprise a solenoid, surrounding the ferromagnetic bolt. When activated by an electric current, the solenoid holds the bolt with the gate in the closed position. With the solenoid activated, the gate can be opened by a force above a second threshold (the second attachment force). Whilst an arming unit comprises a solenoid has been described above, in practice any locking mechanism suitable for selectively providing an attachment force for a frangible connector may be used. For example, the arming unit may comprise a pneumatic piston and/or a locking mechanism comprising a movable pin to which a frangible connector may be coupled.

Thus, if an attachment (e.g. a loop of cable or a ring) defining an aperture corresponding to the arming unit is placed around the gate, the arming unit can effect a two-tiered retaining force on the attachment (and whatever may be attached to it) depending on whether the solenoid is activated or not.

The second attachment force may be greater than the breaking force of the first frangible connector.

The first attachment force may be lower than the breaking force of the second frangible connector.

In one example, upon activation of the ejector release unit and wherein the arming units are energised, the second frangible connector of the first and second attachment systems may be configured to break under the weight of the store, such that the load from the store is transferred to the ejector release unit via the arming connector thereby activating the first input of the fuze system.

The first frangible connector of the first and second attachment systems is configured to break following activation of the first input of the fuze system under the weight of the store.

In one example the linking connector is configured to be connected with a lid of a first fuze input of the store. The lid may be operable to deploy a wind turbine.

In one example, there is provided a method of operating the arming apparatus comprising: energising the first arming unit and the second arming unit; and releasing the store from hooks of the ejection release unit.

In one example, there is provided a method of installing an arming apparatus comprising: identifying first and second ends of the apparatus based on the first coupling arrangement and the second coupling arrangement; coupling the first frangible connector of the first attachment system to said first arming unit, coupling the second frangible connector of the first attachment system to a first lug of said store; coupling the first frangible connector of the second attachment system to said second arming unit, coupling the second frangible connector of the second attachment system to a second lug of said store; and coupling the arming clip to said arming connector.

BRIEF DESCRIPTION OF THE DRAWINGS

Examples of the present disclosure will now be described with reference to the accompanying drawings, in which:

FIGS. 2c, 2d, 2e, 2f, 2g, 2h and 2i show various coupling arrangements and/or clips;

DETAILED DESCRIPTION

Figure 1:
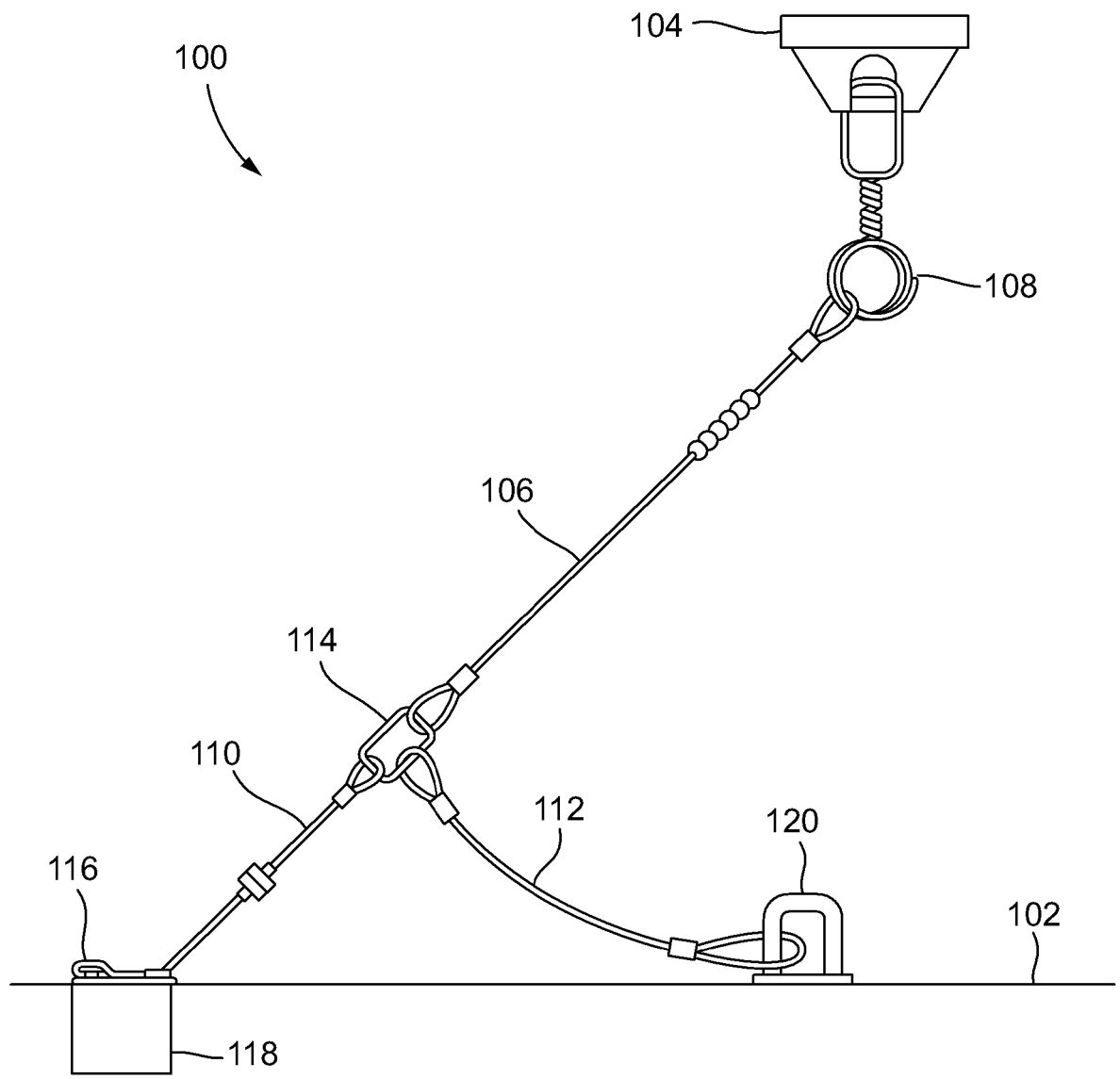
FIG. 1 shows an example of part of an example of existing arming apparatus.

FIG. 1 shows a side view of an example of known part of an arming apparatus 100. FIG. 1 shows an example of a connection between an ejector release unit (not shown) and a store 102 via an arming unit 104. In this example, one arming unit 104 works with one fuze system 118.

A first cable 106 is attached to the arming unit 104 via a swivel link assembly 108. The first cable 106 is coupled at a second end to a second cable 110 and a third cable 112 at a connection point 114. The connection point 114 may comprise a ring that receives a looped end or hook of each of the first cable 106, second cable 110 and third cable 112. The second cable 110 is attached to a lid 116 of an electrical input 118 of a fuze system (not shown). The third cable 112 is connected at one end to a suspension lug 120 of the store 102.

In this example, the lid 116 of the electrical input 118 system comprises a wind turbine. After the lid 116 is opened, the rotors of the wind turbine will rotate, which generates electricity for the electrical input of the fuze system 118. In order for the wind turbine to operate efficiently, it needs to be opened at a correct angle with respect to the store 102. As shown in FIG. 1, the first cable 106 and the second cable 110 are angled with respect to the vertical. The purpose of angling the first cable 106 and the second cable 110 with respect to the vertical is to enable the lid 116 of the electrical input 118 to be opened such that it is within an operating cone angle for the lid 116 of the electrical input 118.

The purpose of the third cable 112 is to ensure that the first cable 106 and the second cable 110 are released together as the store 122 is ejected. In other words, the first cable 106, the second cable 110 and the third cable 112 are removed from the arming unit 104 and remain attached to the store 122 and the store 122 has been ejected. In this existing system, relatively long lengths of cables are required in order to ensure that the lid 116 is opened within the acceptable operating cone angle.

Further, in the event of a failed jettison, i.e., the pilot intends to jettison the store 102, but the arming unit keeps a relatively high retaining force, the store 102 may be released in an armed state, which is highly undesirable.

Figure 2A:
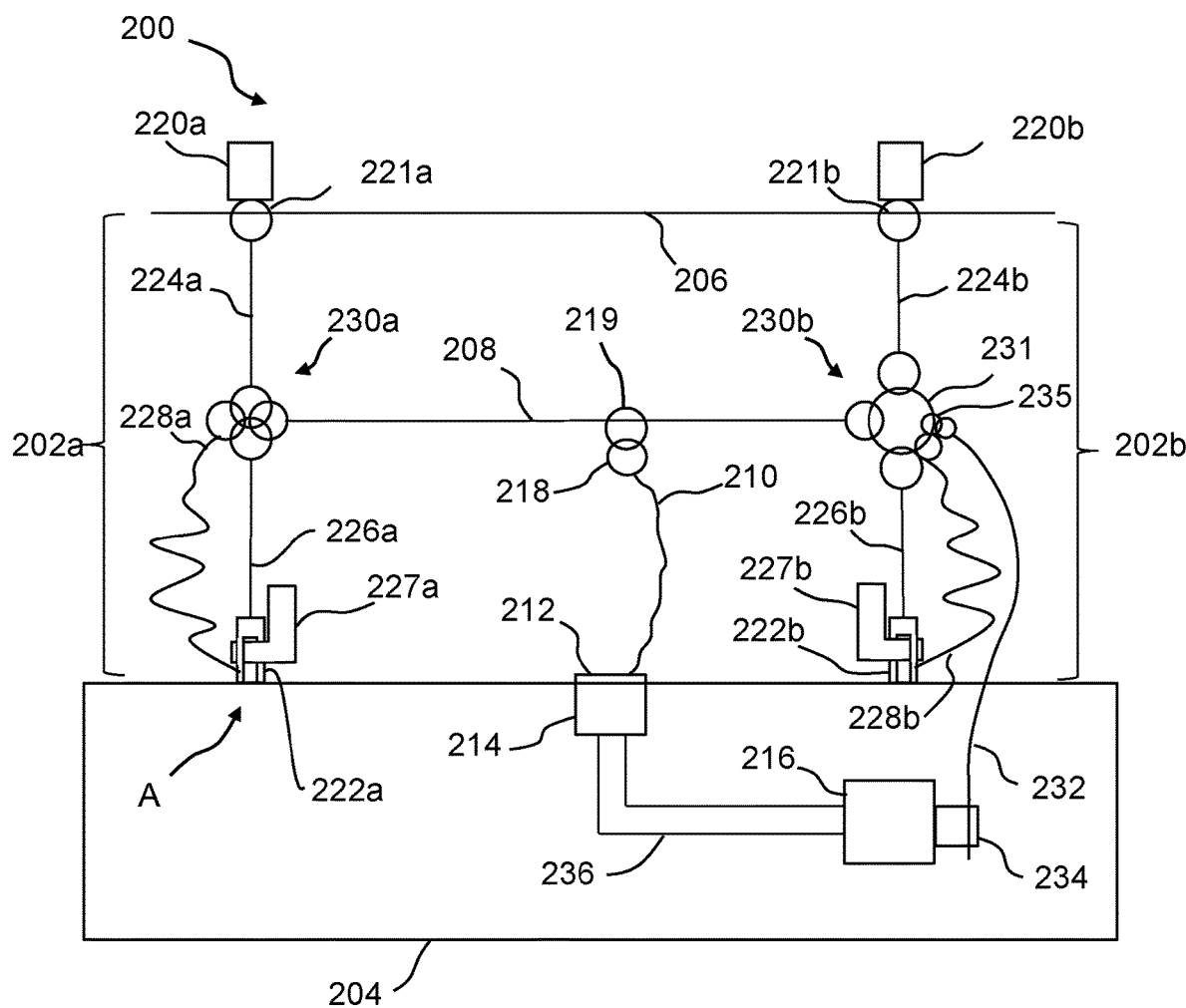
FIG. 2a shows a first example of the present disclosure.

FIG. 2a shows a first example of an arming apparatus 200 for a store 204, such as a munitions projectile, according to the present disclosure. Whilst the store 204 comprises a munitions projectile in FIG. 2a, the arming apparatus 200 is configured to work with other stores too. For example, the store may take the form of any releasable component from an aircraft. In particular, the arming apparatus 200 is suitable for providing a mechanical input to a releasable component upon release from an aircraft. Other examples of stores include drones, surveillance apparatus and the like.

The arming apparatus 200 includes a first attachment system 202a and a second attachment system 202b. Each of the first attachment system 202a and the second attachment system 202b is configured to link a store 204 to an ejector release unit 206.

A linking connector 208 is coupled with the first attachment system 202a and the second attachment system 202b and is configured to extend between the first attachment system 202a and the second attachment system 202b. In one example, the linking connector 208 comprises a lanyard. In one example, the linking connector 208 is a fixed length element.

The arming apparatus 200 also comprises an arming clip 219 coupled with the linking connector 208. The arming clip 219 is configured to connect with an arming connector 210, which may be part of the arming apparatus 200 or alternatively be part of fuze system 216. The arming connector 210 may be coupled to the arming clip 219 and a lid 212 of an electrical input 214 of a fuze system 216. In some examples, the fuze system 216 does not include a lid 212. The electrical input 214 may be connected to the fuze system 216 via one or more wires 236. In one example, the arming connector 210 is a fixed length element. The arming connector 210 may be coupled to the arming clip 219 via a coupling device 218, such as a ring. In some examples, the coupling device 218 is integral with the arming connector 210. The connection between the arming connector 210 and the coupling device 210 may be identical to the connection shown in FIG. 2d, e.g. have a crimped arrangement. The arming clip 219 can move along the linking connector 208 such that the angle between arming connector 210 and the lid 212 of the electrical input 214 may be self-adjusted, in use. Using a clip 219 to couple to the coupling deice means that a user can manually release the apparatus 200 from the arming connector 210, in use.

The arming clip may comprise a hook with a manually operable member for selectively enclosing the arming connector 210. The arming clip may have the general form of a carabiner clip, a maillon or a shackle. The arming clip may have the form of a resilient member (e.g. a wire) bent back on itself and biased so that the overlapping portions are urged into contact with one another.

Once the lid 212 of the electrical input 214 is opened, it may be locked in place so that it remains open. In this example, the lid 212 of the electrical input 214 of the fuze system 216 comprises a wind turbine. After the 212 is opened, the rotors of the wind turbine will rotate, which generates electricity for the electrical input of the fuze system 216.

The first attachment system 202a is coupled to a first arming unit 220a and a first lug 222a of the store 204. The second attachment system 202b is coupled to a second arming unit 220b and a second lug 222b. In other words, each of the first attachment system 202a and the second attachment system 202b is coupled to a respective arming unit 220a, 220b and a respective lug 222a, 222b of the store 204. The first attachment system 202a and the second attachment system 202b are coupled to a respective arming unit 220a, 220b via an attachment. In some examples, the attachment comprises a loop or a ring or a coupler to connect the attachment systems to the respective arming units.

In one example, the first lug 222a is a forward lug of the store 204 and the second lug 222b is a rearward lug of the store 204. In this example, the first arming unit 220a is a forward arming unit and the second arming unit 220b is a rear arming unit. In one example, the store 204 is coupled to the aircraft via one or more ejector release unit suspension hooks 227a, 227b. The ejector release unit suspension hooks 227a, 227b are controllable by the pilot to enable the pilot to release the store 204 from the suspension hooks 227a, 227b in operation.

Each of the first attachment system 202a and second attachment system 202b comprises a first frangible connector 224a, 224b coupled with the respective arming unit 220a, 220b and the linking connector 208. Each of the first frangible connectors 224a, 224b comprise an attachment 221a, 221b for coupling to the respective arming units 220a, 220b.

In addition, each of the first attachment system 202a and the second attachment system 202b comprises a second frangible connector 226a, 226b coupled with the linking connector 208 and the store 204. In one example, the second frangible connector 226a, 226b is coupled with a lug 222a, 222b of the store 204. The second frangible connector 226a, 226b comprises a first end coupled with the linking connector 208. In one example, the second frangible connector 226a, 226b is coupled to the linking connector 208 via one or more rings.

The second frangible connector 226a, 226b comprises a second end that is configured to pass through a lug of said store 204. A clip 233b may be present at the second end of the second frangible connector 226a, 226b and pass through the lug of said store 204. In some examples, the clip 233b is configured to couple to the second frangible connector between the first end and the second end of the second frangible connector 226a, 226b.

The clip 233b may comprise a hook that may clip or hook onto another element member. In some examples, the clip 233b comprises a manually operable member. The hook and manually operable member may selectively enclose a further member.

For example, the second frangible connector 226a of the first attachment system 202a is coupled to a first lug 222a of the store 204 and the second frangible connector 226b of the second attachment system 202b is coupled with a second lug 222b of the store 204.

The first lug 222a and the second lug 222b may comprise bail lugs that are screwed into the store 204. The first lug 222a and the second lug 222b may have loops for receiving the second frangible connectors 226a, 226b of the first attachment system 202a and the second attachment system 202b.

In one example, the linking connector 208 comprises a first connection point 230a at a first end of the linking connector 208 and a second connection point 230b at a second end of the linking connector. The linking connector 208 is configured to couple with the first attachment system 202a at the first connection point 230a via a first coupling arrangement. The linking connector 208 is configured to couple with the second attachment system 202b at the second connection point 230b via a second coupling arrangement, which is different that the first coupling arrangement. The first coupling arrangement and the second coupling arrangement have different structural configurations. That is to say that they have a different geometric arrangement, and a user would be able to readily identify that they are different (i.e., they differ by more than slight inconsistencies due to manufacturing tolerances and the like).

For example, the linking connector 208 may be configured to directly couple to the first attachment system 202a. In other words, the first end of the linking connector 208 may directly couple to the first frangible connector 224a and the second frangible connector 226a. In some examples, the linking connector 208 comprises a ring at the first end that is coupled with respective rings of the first frangible connector 224a and the second frangible connector 226a. However, there is not an intermediate ring between the linking connector 208, the first frangible connector 224a and the second frangible connector 226a at the first connection point 230a.

In contrast, at the second connection point 230b, the linking connector 208 may configured to be coupled to the first frangible connector 224b and the second frangible connector 226b via an intermediate coupler 231, such as an intermediate ring. The presence of the intermediate coupler 231 aids with the orientation of the arming apparatus 200. In other words, the presence of the intermediate coupler 231 means that a technician will easily be able to identify the from and rear of the arming apparatus 200 and install it in the correct orientation. The intermediate coupler 231 may not necessarily be ring shaped and may take the form of other shapes in practice.

The first coupling arrangement and the second coupling arrangements are configured to be manually secure. That is to say that a user or technician would not be able to undo the coupling manually without the use of equipment. This is in contrast to the coupling at other points in the apparatus 200 where couplings are not manually secure but manually releasable. That is to say that a user could manually decouple the coupling without the need for further equipment. An of a manually releasable coupling is between the second frangible connector 226a, 226b and the lugs 222a, 222b of said store 204.

The first frangible connector 224a of the first attachment system 202a may be configured to be coupled between the first arming unit 220a and the first connection point 230a and the first frangible connector 224b of the second attachment system 202b may be configured to be coupled between the second arming unit 220b and the second connection point 230b. Further, the second frangible connector 226a of the first attachment system 202a may be configured to be coupled between the first connection point 230a and the first lug 222a of the store 204. The second frangible connector 226b of the second attachment system 202b may be configured to be coupled between the second connection point 230b and the second lug 222b of the store 204.

The first frangible connector 224 is configured to break at a pre-determined load. For example, the first frangible connector 224 may have a breaking load or breaking force of between approximately 700N and 1000N. If the first frangible connector 224 is subject to a load of above the breaking force, then it will break. In one example, the first frangible connector 224 and the second frangible connector 226 are shear wires, but other types of frangible connectors may be used in practice. A frangible connector is any element that has a predetermined breaking force. For example, any cable, connector, thread that is configured to break at a predetermined breaking force may be considered to be a frangible connector.

The second frangible connector 226 is also configured to break at a predetermined load. In one example, the first frangible connector 224 has a higher breaking force compared with the breaking force of the second frangible connector 226. In other words, the first frangible connector 224 may be subjected to a high load compared with the second frangible connector 226 before it breaks. As such, if subjected to the same load, the second frangible connector 226 is configured to break before the first frangible connector 224. In this example, as an increasing load is applied to the first attachment system 202a and the second attachment system 202b, the second frangible connector 226 will be configured to break as the increasing load passes the breaking force of the second frangible connector 226.

In one example, the second frangible connector 226 has a breaking load or breaking force of between 100N and 200N.

In one example, the arming apparatus 200 also comprises a first safety connector 228a configured to be coupled between the linking connector 208 and the store 204, for example, via the first connection point 230a and the first lug 222a. The arming apparatus 200 may also comprise a second safety connector 228b configured to be coupled between the linking connector 208 and the store 204, for example, via the second connection point 230b and the second lug 222b. The first safety connector 228a and the second safety connector 228b are optional.

In one example, the length of the first safety connector 228a and the second safety connector 228b is substantially identical. Each of the first safety connector 228a and the second safety connector 228b has a longer length compared with the length of the arming connector 210. Providing a first safety connector 228a and second safety connector 228b that are longer than the length of the arming connector 210 means that the electrical input 214 of the fuze system 216 will be activated prior to the first safety connector 228a and second safety connector 228b become taut, as will be discussed in more detail below.

In one example, the fuze system 216 comprises a first input 214 and a second input 234, both of which are required to be activated to arm the fusing system 216. As previously described, the first input 214 may be an electrical input and the second input 234 may be a mechanical input such as a gag rod. A gag rod wire 232 passes through the second input 234. In operation, to activate the second input 234 a gag rod wire 232 needs to be physically removed from the gag rod 234.

FIG. 2a shows an example of the gag rod wire 232 being coupled with the second input 234 of the fuze system 216 and the second attachment system 202b, via a gag rod attachment 235. For example, gag rod 232 is attached to the gag rod attachment 235 at the second connection point 230b of the second attachment system 202b. The gag rod attachment 235 may comprise a clip that may clip onto a ring of the gag rod 232 in use.

Figure 2B:
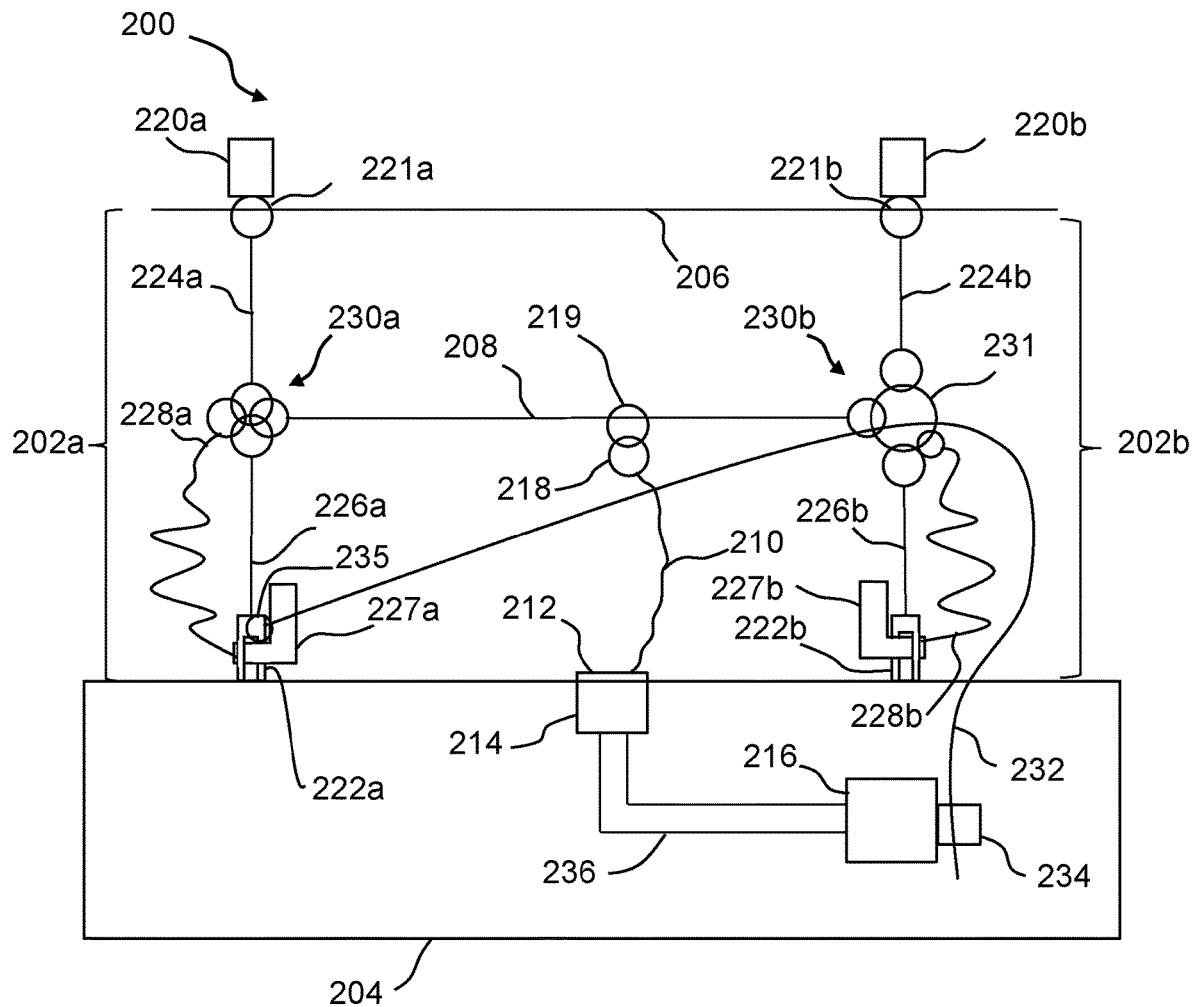
FIG. 2b shows a second example of the present disclosure.

FIG. 2b shows an alternative example of an arming apparatus 200 for a store 204. The example in FIG. 2b is identical to the example shown in FIG. 2a, except that the gag rod wire 232 passes through the second connection point 230b of the linking connector 208 and is coupled with the gag rod attachment 235 at the first lug 222a of the store 204.

FIGS. 2c and 2d show examples of an end detail of a second frangible connector 226b coupled with an intermediate coupler 231 or a ring at the end of the second frangible connector 226b. Note that this detail is equally applicable to other elements, such as the first frangible connector 224b or linking connector 208 too.

In this example, a portion of the second frangible connector 226b is fed through the intermediate coupler 231 and returns along the second frangible connector 226b. A shroud or sleeve 229 is then passed over the parts of the second frangible connector 226b that are adjacent to each other as shown in FIG. 2c.

In FIG. 2d, the sleeve 229 is reduced in size to crimp or bind the adjacent parts of the second frangible connector 226b together. In one example, the sleeve 229 may be mechanically compressed or heat shrunk between FIGS. 2c and 2d. The crimping ensures a solid connection between the second frangible connector 226b (or other elements as mentioned above) and an additional element such as an intermediate coupler 231.

FIG. 2e shows an alternative example of a connection between elements. In this example, a first frangible connector 224a and a second frangible connector 226a are referenced, but this detail may be applicable to other connections in the system too. This arrangement is identical to the examples shown in FIGS. 2c and 2d except that the first frangible connector 224a is directly coupled to the second frangible connector 226a. The crimping arrangement of the sleeve 229 is the same as FIG. 2d except that a portion of the frangible connector loops around a portion of another frangible connector rather than a ring or intermediate coupler 231.

FIG. 2f shows an alternative coupling arrangement. In this example, the sleeve 229 comprises at least three channels through which a frangible wire can pass. A wire, such as from a second frangible connector 226a passes through a first channel in a sleeve 229, then returns back on itself to pass through a second channel in the sleeve 229, then returns back on itself again through a third channel in the sleeve 229. The meander of the wire through the sleeve should lock the wire in place by way of friction; however the sleeve 229 may be reduced in size to further crimp or bind the frangible connector in place. The arrangement in FIG. 2f may be referred to as a shear locking device.

Figure 2G:
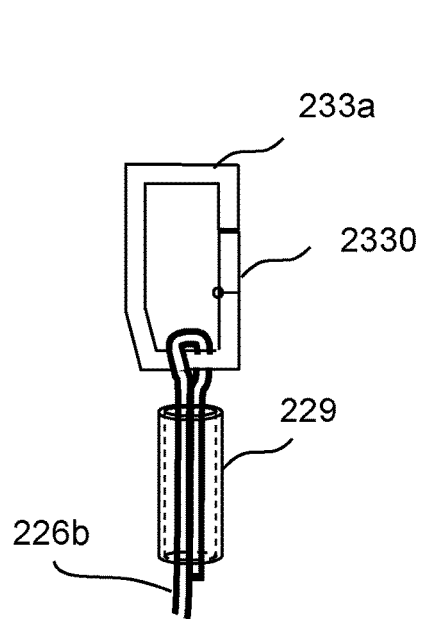
Figure 2H:
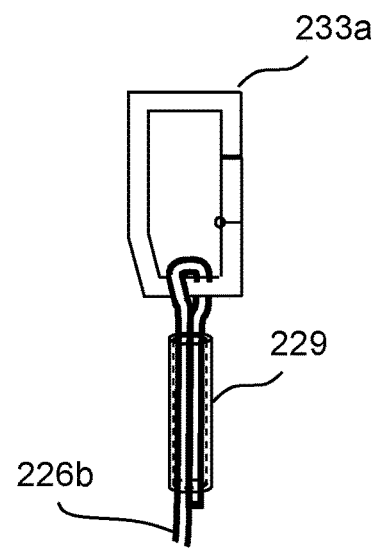

FIGS. 2g and 2h show examples of an end detail of a second frangible connector 226b coupled with a clip 233a at the end of the second frangible connector 226b.

In this example, a portion of the second frangible connector 226b is fed through the clip 233a and returns along the second frangible connector 226b. A shroud or sleeve 229 is then passed over the parts of the second frangible connector 226b that are adjacent to each other as shown in FIG. 2g.

In FIG. 2h, the sleeve 229 is reduced in size to crimp or bind the adjacent parts of the second frangible connector 226b together. In one example, the sleeve 229 may be mechanically compressed or heat shrunk between FIGS. 2g and 2h. The crimping ensures a solid connection between the second frangible connector 226b (or other elements as mentioned above) and an additional element such as the clip 233a.

The clip 233a is in the form of a carabiner clip. As such the clip 233a comprises a pivoted gate 2330 which is manually operable to open and close. Thus by manually opening the gate to allow a further member (e.g. the second frangible connector 226a) entry to the clip 233a, and then manually closing the gate, the clip can couple to the further member. Moreover, by manually opening the gate, the further member can be released from the clip 233; thus the coupling is manually releasable and not manually secure.

Figure 2I:
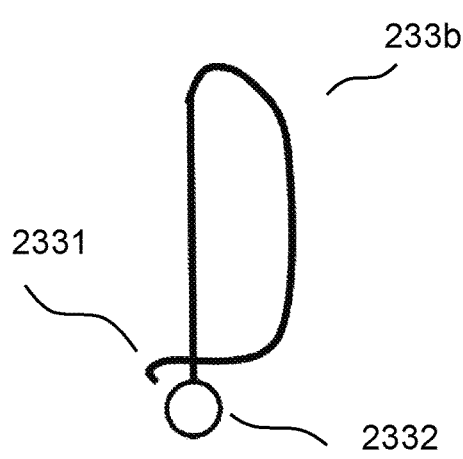

In FIG. 2i there is shown a further clip 233b. The clip 233b comprises a resilient member (e.g. a wire) extending and returning on itself to form a loop, where the portions of the resilient member cross over and are urged into contact with one another.

The clip 233b is provided at one end with a barb 2331 which projects to catch the other end of the member if the loop is forced wider.

The clip 233b is provided at the other end with a ring 2332 for convenient attachment to a wire and crimp arrangement.

In use, the clip 233b can be manually operated to admit a further member (e.g. the second frangible connector 226a) by forcing apart the crossing portions of the resilient member and passing the further member into the loop. Then, with the further member within the loop, the resilient member can be released whereupon the bias of the resilient member will close the loop at the cross over thereby enclosing the further member.

In use the clip 233b can be manually operated to release an enclosed further member by forcing apart the crossing portions of the resilient member and allowing the further member to pass out of the loop. Thus the coupling between the clip 233b and the further member is manually releasable but not manually secure.

Figure 2J:
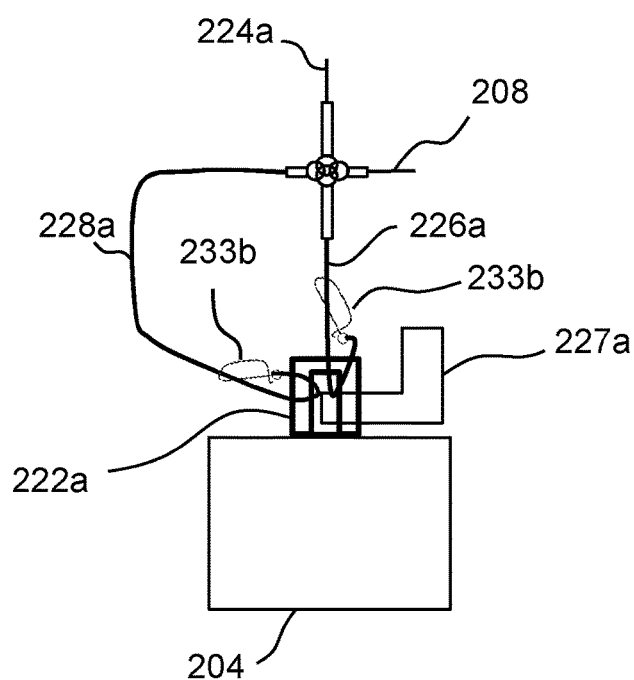
FIG. 2j shows a detail of the connection between the second frangible connector and the store.

FIG. 2j shows an example of the connection between an attachment system and the store, for example the detail indicated by arrow A in FIG. 2A. FIG. 2j is based on the connection between the first attachment system 202a and the store 204, but may equally apply to the connection between the second attachment system 202b and the store 204.

As shown in FIG. 2j, the second frangible connector 226a of the first attachment system 202a comprises a first end coupled with the linking connector 208. The first attachment system 202a comprises a second end that is configured to pass or loop through the first lug 222a of said store 204 and couple to the second frangible connector 226a between the first end and the second end of the second frangible connector 226a. The second frangible connector 226b of the second attachment system 202b comprises a first end coupled with the linking connector 208. The second frangible connector 226b of the second attachment system 202b comprises a second end that is configured to pass or loop through the second lug 222b of said store 204 and couple to the second frangible connector 226b between the first end and the second end of the second frangible connector 226b.

The safety connectors 228a, 228b may have a similar arrangement. That is to say that a first end of the first safety connector 228a is coupled to the linking connector 208 and a second end of the first safety connector 228a is configured to loop through the lug 222a of the store 204 and couple with the first safety connector 228a between the first end and the second end.

Similarly, a first end of the second safety connector 228b is coupled to the linking connector 208 and a second end of the second safety connector 228b is configured to pass or loop through the lug 222b of the store 204 and couple with second safety connector 228b between the first end and the second end.

This arrangement enables the first attachment system 202a and the second attachment system 202b to be quickly attached and detached to the lugs 222a, 222b of the store 204 during the installation of the store 204 in the aircraft. It enables the arming apparatus 200 to be reused with a different store in future if the store 204 was not deployed during flight. As such, the arming apparatus 200 becomes a self-contained apparatus that could be utilised multiple times. Further, the arrangement makes it easier for a technician to connect the arming apparatus 200 to the store 202, during installation.

The second end of the second frangible connector 226a, 226b comprises a clip 233b. The clip 233b clips to the second frangible connector 226a, 226b between the first end and the second end of the second frangible connector 226a, 226b. Alternative clips, such as carabiner clip 233a may be used instead of the clip 233a.

The second end of the safety connector 228a, 228b comprises a clip 233b. The clip 233b clips to the safety connector 228a, 228b between the first end and the second end of the safety connector 228a, 228b. Alternative clips, such as carabiner clip 233a may be used instead of the clip 233a.

The presence of the clips 233b (or alternatively for example clips 233a) means that the first attachment system 202a and the second attachment system 202b are manually connectable to the store 204 and manually releasable from the store 204.

In one example, safety connector 228a, 228b may be crimped to hold the clip 233b in place at the second end of the safety connector 228a, 228b as shown in FIGS. 2c and 2d described above.

The detail shown in FIG. 2j may be equally applicable to the arrangement shown in FIG. 2b, with a difference being that the gag rod wire would also be coupled to the first lug 222a.

FIGS. 3 to 8 show the gag rod wire 232 being coupled to the gag rod attachment 235 at the second attachment system 202b as shown in FIG. 2a. However, in each of these figures, the gag rod wire 232 may be coupled with the gag rod attachment 235 at the first lug 222a of the store 204 as shown in FIG. 2b. The arrangement shown in FIG. 2i may also be present in FIGS. 3 to 8.

The arming unit 220a, 220b may be configured to couple the attachment systems to the ejector release unit 206, e.g. a first arming unit 220a couples the first attachment system 202a to the ejector release unit 206 and the second arming unit 220b couples the second attachment system 202b to the ejector release unit 206. In one example, each of the arming units 220a, 220b comprises an arming solenoid. A pilot may energise the arming unit 220a, 220b to change the pull-out force required to remove the first frangible connector 224 from the arming unit 220. In one example, the arming unit 220 has a relatively low pull-out force when it is unenergised and a relatively high pull-out force when the arming unit is energised. In one example, the pull-out force of the first frangible connector 224a, 224b from the arming unit 220a, 220b when it is unenergised is between approximately 35N and 70N. The pull-out force of the first frangible connector 224a, 224b from the arming unit 220a, 220b when it is energised is above approximately 1100N. In some examples, the unenergised pull-out force of the first frangible connector 224a, 224b from the arming unit 220a, 220b is lower than the break strength of the second frangible connector 226a, 226b. In one example, the energised pull-out force of the first frangible connector 224a, 224b from the arming unit 220a, 220b is higher than the breaking strength of the second frangible connector 226a, 226b. The weight of the store 204 is more than twice the breaking strength of the first frangible connector 224a, 224b, the breaking strength of the second frangible wire 226a, 226b and the pull-out force of the arming units, whether in an unenergised or energised state.

As described above, the store 204 may be coupled to the aircraft via one or more ejector release unit suspension hooks 227a, 227b. The ejector release unit suspension hooks 227a, 227b are controllable by the pilot to enable the pilot to release the store 204 from the suspension hooks in operation. In one example, the one or more ejector release unit suspension hooks 227a, 227b are part of the aircraft rather than being part of the arming apparatus.

The jettison sequence of the system will now be described. The initial state of the arming apparatus 200 is shown in FIGS. 2a and 2b. The arming units 220a, 220b are in an unenergised state, such that they have a relatively low pull-out force requirement.

The pilot will activate the jettison sequence. This causes the store 204 to be released from the ejector release unit suspension hooks 227a, 227b. In some examples, at this stage, the store 204 may be pushed away from the aircraft by one or more ejector release unit rams.

Figure 3:
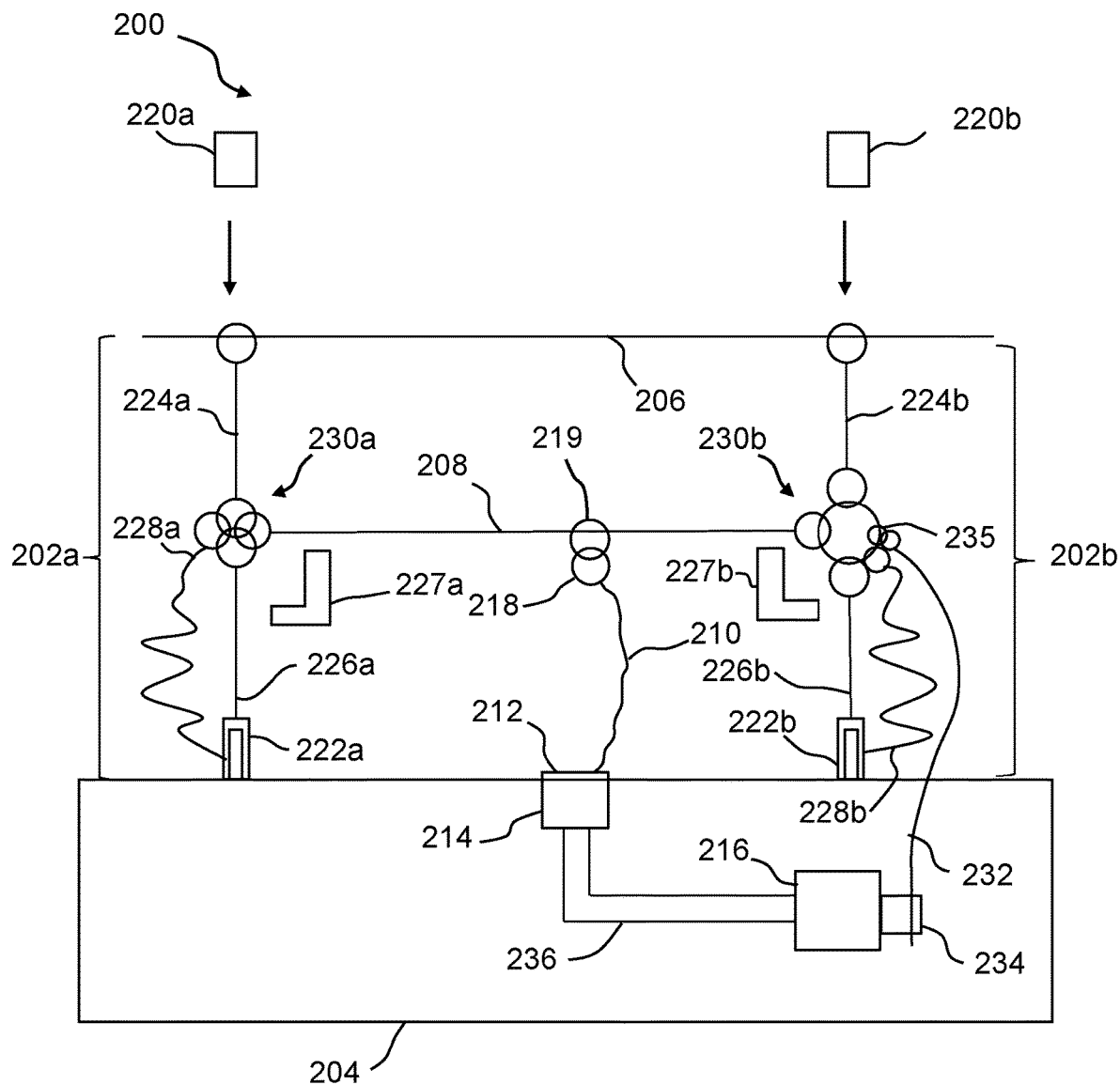
FIG. 3 shows an example of a store being released from an ejector release unit during a jettison release.

FIG. 3 shows the next stage of the jettison sequence of the arming apparatus 200. The weight of the store 204 will be transferred to the first attachment system 202a and the second attachment system 202b. In other words, the weight of the store 204 will be transferred to the ejector release unit 206 via the second frangible connector 226a, 226b, the first frangible connector 224a, 224b and the attachment coupled to the arming unit 220a, 220b of each of the first attachment system and the second attachment system 202b. As the arming units 220a, 220b are in an unenergised state, there is a relatively low pull-out force required to remove the first frangible connectors 224a, 224b from the respective arming units 220a, 220b. The breaking strengths of the first frangible connector 224a, 224b and the second frangible connector 226a, 226b is higher than the pull-out force of the first frangible connectors 224a, 224b from the arming units 220a, 220b in the unenergised state. As such, the weight of the store 204 will pull the respective first frangible connectors 224 from the respective arming units 220, as shown by the arrows in FIG. 3.

In this example, the first frangible connector 224a, 224b, the second frangible connector 226a, 226b, the linking connector 208, the arming connector 210 and the safety connectors 228 are released together with the store 204. The gag rod wire 232 is not removed from the fuze system 216 and the lid 212 of an electrical the input 214 of a fuze system 216 is not opened. Therefore, in the jettison sequence, neither of the two inputs of the fuze system 216 are activated and the store 204 is released in an unarmed state.

The live release sequence of the system will now be described. The initial state of the arming apparatus 200 is shown in FIG. 2a or 2b. The pilot initiates the live release sequence, which energises the arming units 220a, 220b. As such, the pull-out force of the first frangible connectors 224a, 224b from the arming units 220a, 220b is increased to above the breaking strengths of first frangible connectors 224a, 224b and the second frangible connectors 226a, 226b.

The store 204 is then released from the ejector release unit suspension hooks 227a, 227b. In some examples, at this stage, the store 204 may be pushed away from the aircraft by one or more ejector release unit rams.

Figure 4:
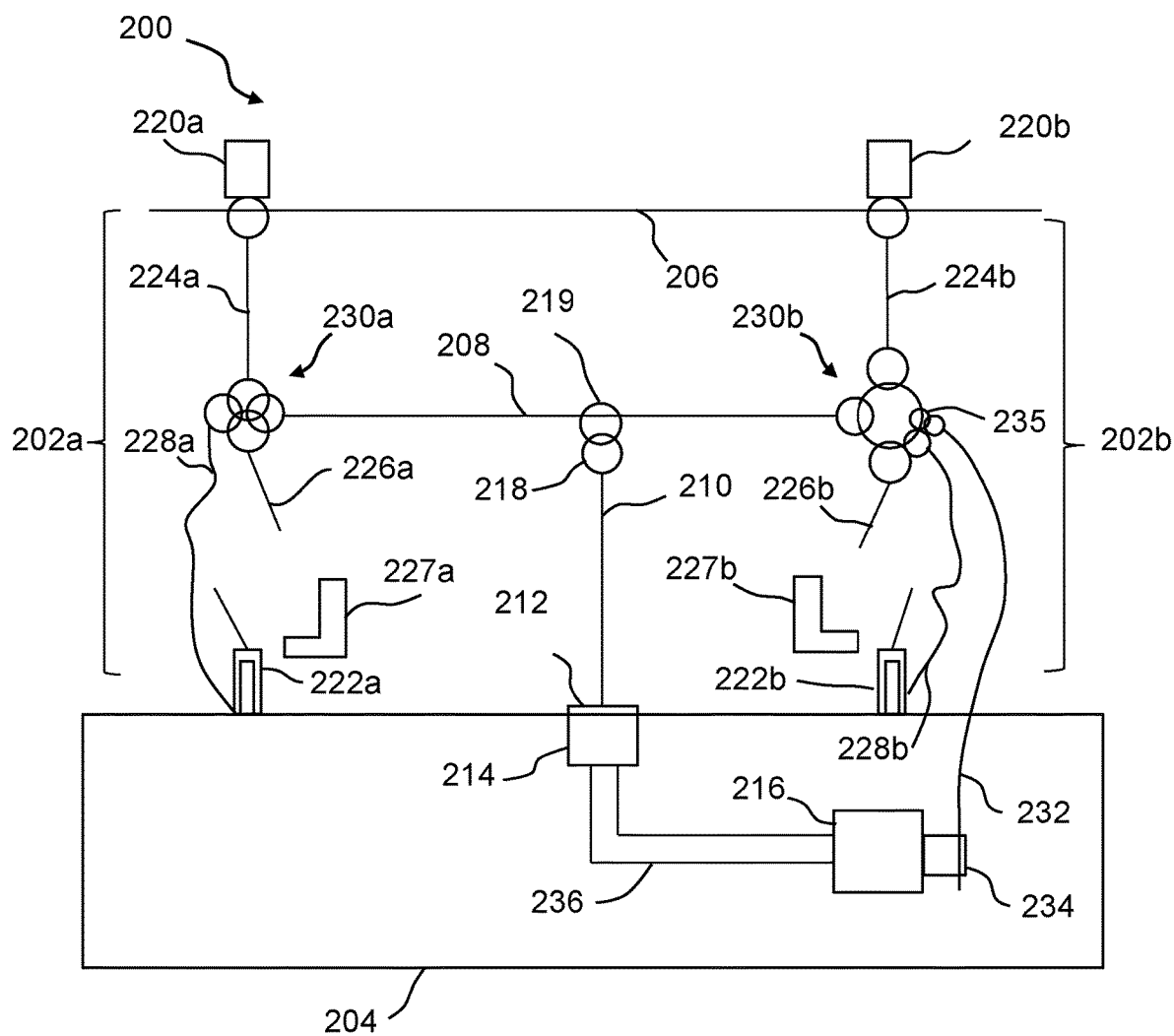
FIG. 4 shows an example of the first stage of a release of a store from an ejector release unit during a live release.

FIG. 4 shows the example of the next stage of the live release sequence. Following the release of the store 204 from the ejector release unit suspension hooks 227a, 227b, the weight of the store 204 is transferred to the ejector release unit 206 via the first attachment system 202a and the second attachment system 202b. In this example, the weakest element in each of the attachment systems 202a, 202b is the second frangible connector 226a, 226b. As such, the second frangible connector 226a, 226b of each of the attachment systems 202 breaks because the weight of the store is greater than the breaking strength of the second frangible connector 226a, 226b and the limiting factor in each of the attachment systems is the strength of the second frangible connector 226a, 226b.

As shown in FIG. 4, following the breaking of the second frangible connectors 226a, 226b, the load path of the store 204 now passes through the arming connector 210 and so the arming connector 210 becomes taut.

Figure 5:
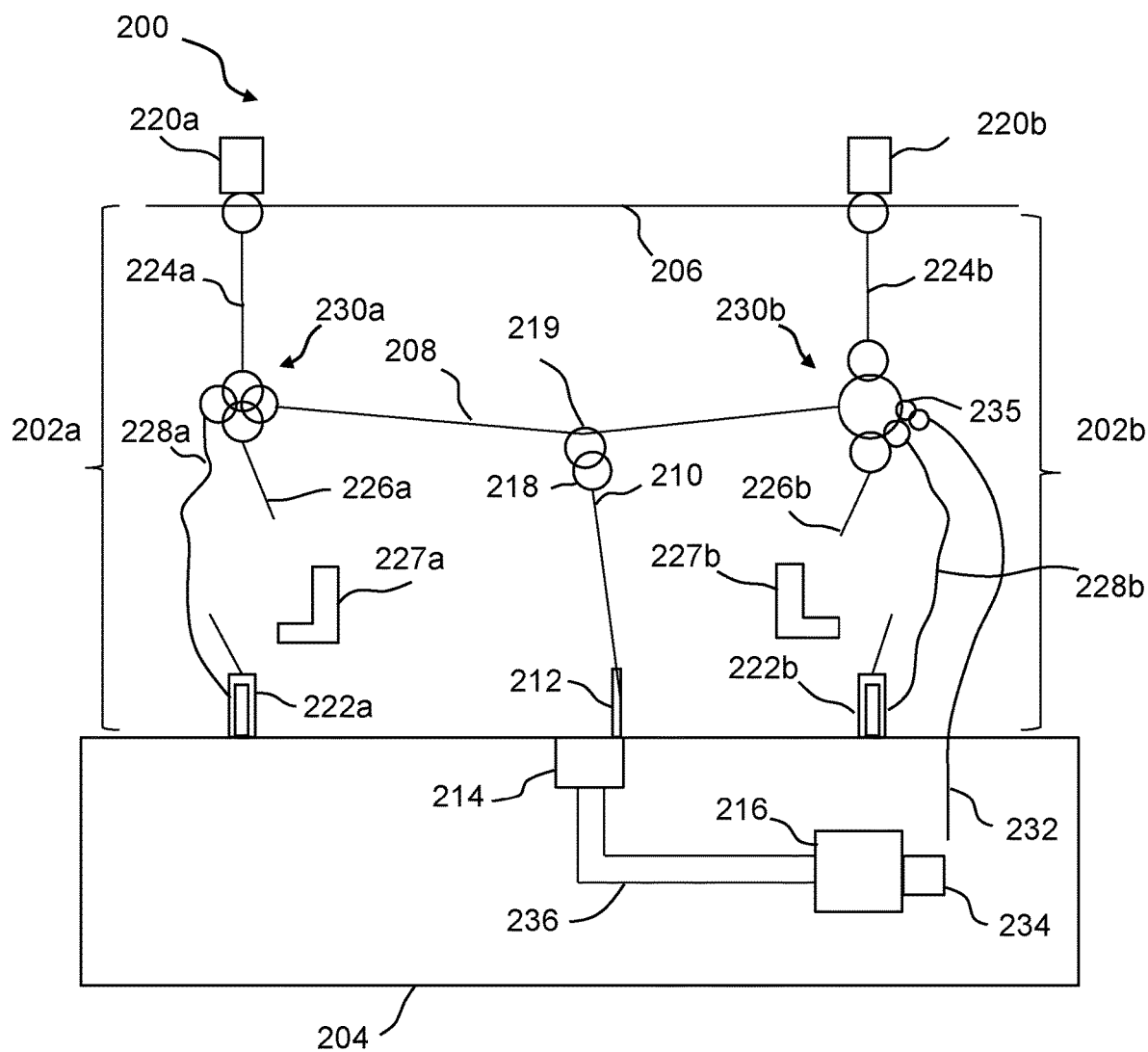
FIG. 5 shows an example of the second stage of a release of a store from an ejector release unit during a live release.

FIG. 5 shows the next stage of the live release sequence. Due to the load path travelling through the arming connector 210, the lid 212 of the first input 214 of the fuze system 216 is opened. As such, the first input 214 of the fuze system 216 will be activated.

As the store 204 has dropped further from the ejector release unit 206, the gag rod wire 232 is removed from the second input 234 of the fuze system 216, which enables the fuze system 216 to be activated by electrical power from the electrical input 214. Therefore, both the first input 214 and the second input 234 of the fuze system 216 are activated.

FIG. 5 shows that the linking connector 208 may deform as the weight of the store 204 is transferred to from through the arming connector 210 to the linking connector 208 to each of the first frangible connectors 224a, 224b of each of the first attachment system and the second attachment system 202. In one example, the linking connector 208 is deformed to have a "V-shape". In the example in which the arming connector 210 is coupled to the arming clip 219 via the coupling device 218, the coupling point between the arming connector 210 and the linking connector 208 may change. The provision of the coupling device 218 and arming clip 219 means that the lid 212 of the first input 214 is opened within the correct range of operating angles.

Figure 6:
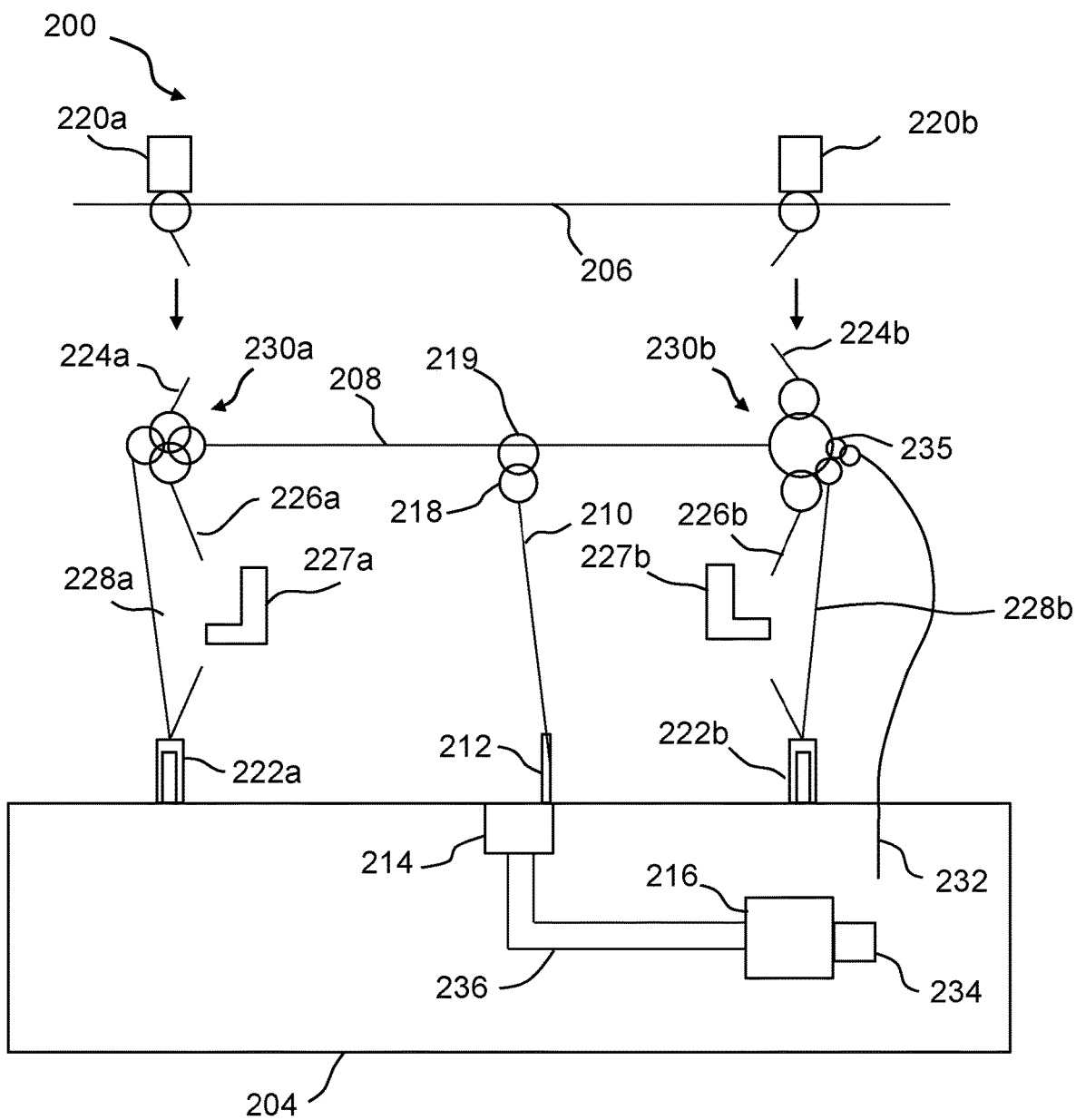
FIG. 6 shows an example of the third stage of a release of a store from an ejector release unit during a live release.

FIG. 6 shows the next stage of the live release sequence. After the lid of the first input 214 is opened, the safety connectors 228a, 228b become taut and the load path of the store 204 to the ejector release unit 206 passes through the safety connectors 228a, 228b to the first frangible connectors 224a, 224b of each of the attachment systems 202a, 202b to the arming units 220a, 220b via the respective attachments. The next limiting factor of the system 200 is the strength of the first frangible connectors 224a, 224b and these will break, as shown in FIG. 6. The store 204 will fall away from the ejector release unit 206 as indicated by the arrows in FIG. 6. As the first frangible connectors 224a, 224b break, the store 204 is no longer connected to the ejector release unit 206 and will be released in a live state as both the first input 214 and the second input 234 of the fuze system 216 are activated. The safety connectors 228a, 228b ensure that the various connectors are released together with the store 204 to avoid them causing damage to the aircraft due to them flailing under the aircraft. The safety connectors 228a, 228b ensure that the various connectors that are released remain attached to the store 204.

A failed jettison sequence of the system 200 will now be described. The starting condition is shown initially in FIG. 2a or 2b. As per the normal jettison sequence, in a failed jettison event neither of the arming units 220a, 220b are energised. However, one of the arming units, may become in a locked state such that it acts as if it has been energised and has a relatively high pull-out force of the first frangible connector 224b from the second arming unit 220b. In one example, the arming unit 220a, 220b may become locked due to internal wear of components that creates dust that jams the internal mechanism of the arming units 220a, 220b.

Figure 7A:
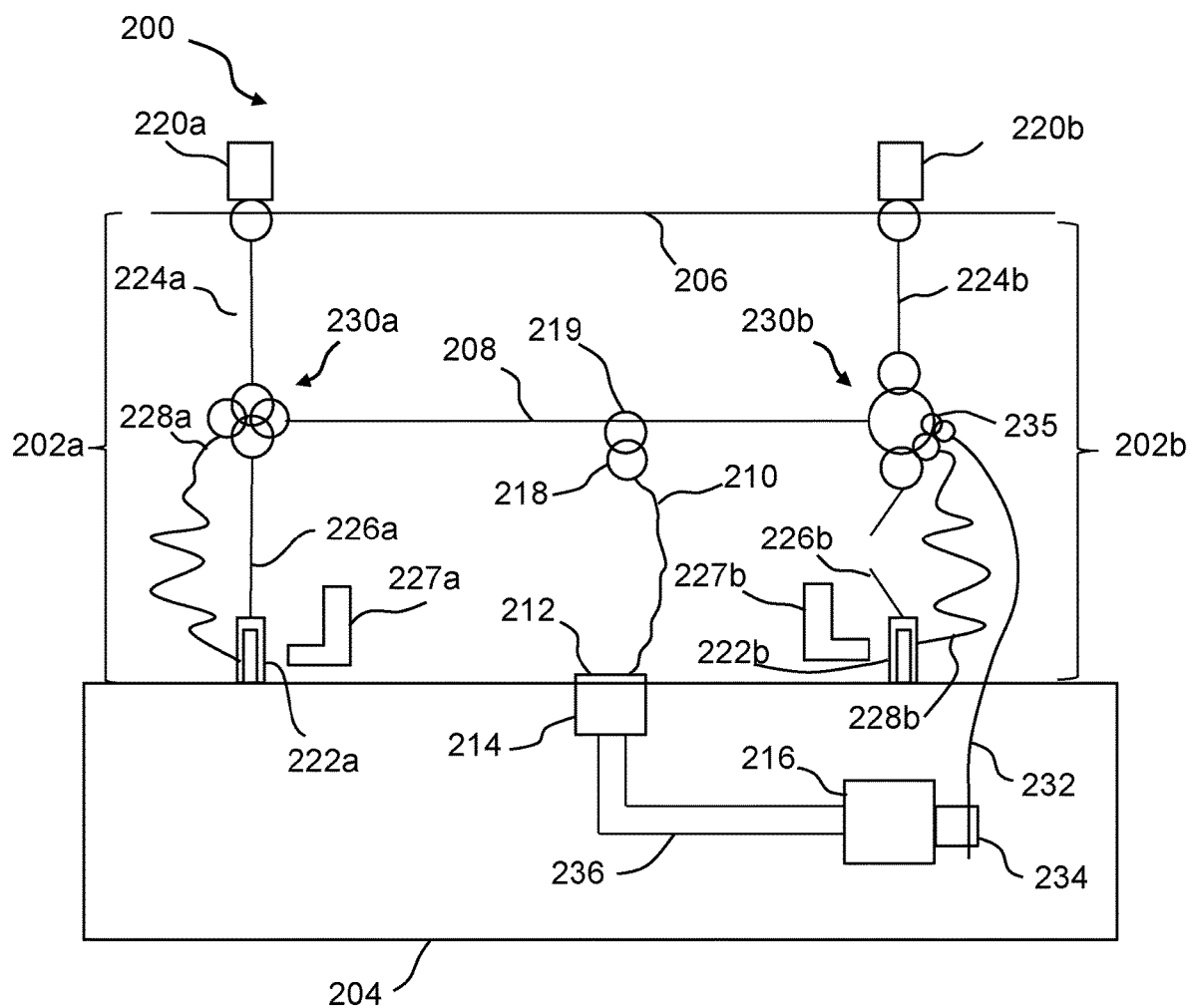
FIG. 7a shows an example of the first stage of a release of a store from an ejector release unit during a failed jettison release in a first example.

FIG. 7a shows the first stage of a failed jettison event in which the second arming unit 220b has failed and is in a locked state. Following the release of the store 204 from the ejector release unit suspension hooks 227a, 227b, the weight of the store 204 is transferred to the ejector release unit 206 via the first attachment system 202a and the second attachment system 202b. In this example, in the first attachment system 202a, the first frangible connector 224a is released from the first arming unit 220a as per the standard jettison event. However, in the second attachment system 202b, the first frangible connector 224b is locked in the arming unit 220b and so isn't released as intended.

The linking connector 208 may begin to pivot or rotate as the first attachment system 202a separates downwards away from the first arming unit 220a. The next weakest element is the second frangible connector 226b and the load path from the store 204 to the ejector release unit 206 will pass through the second attachment system 202b, which causes the second frangible connector 226b to break.

Figure 7B:
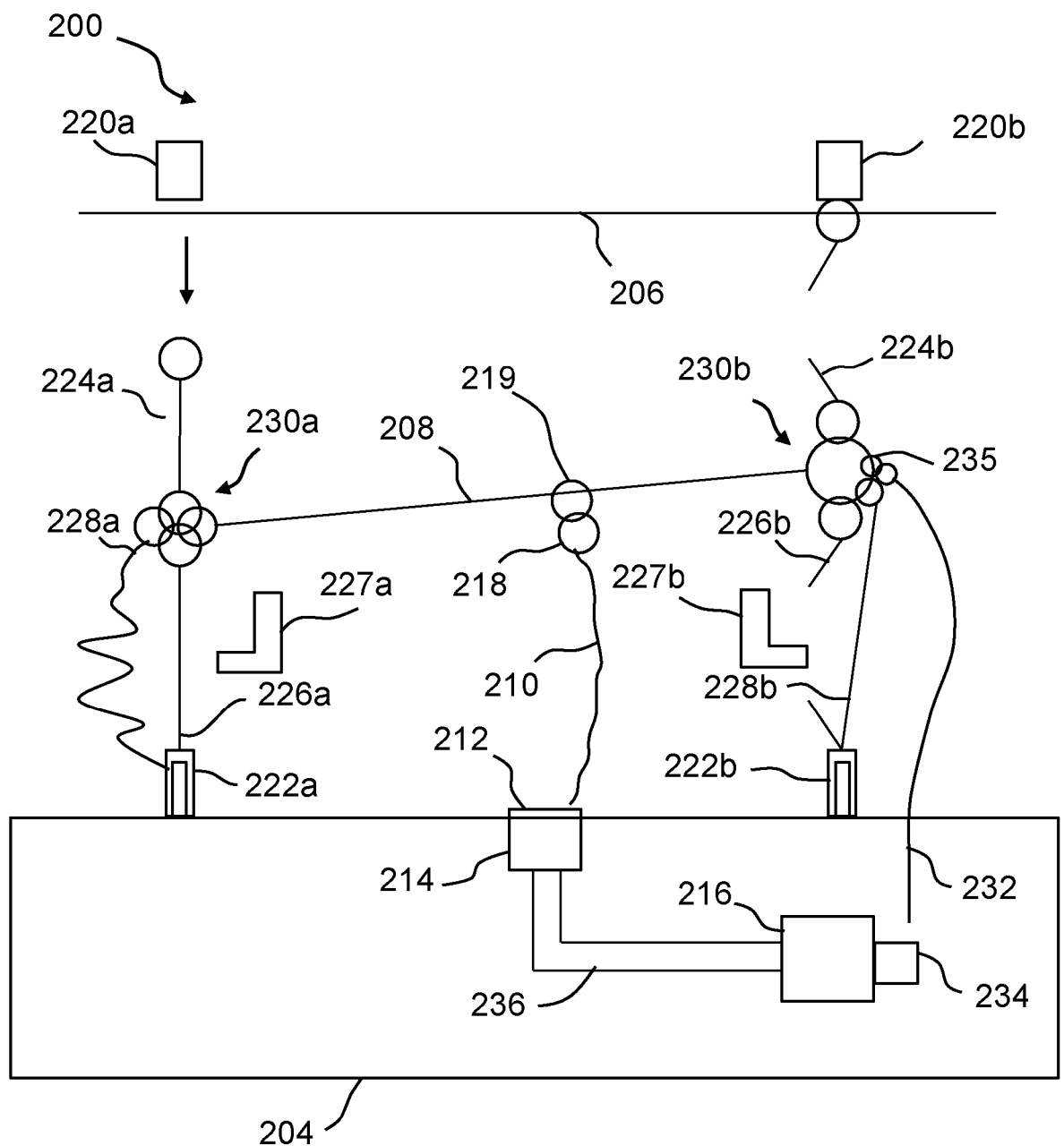
FIG. 7b shows an example of the second stage of a release of a store from an ejector release unit during a failed jettison release in a first example.

The next stage of the failed jettison event is that the safety connector 228b of the second attachment system 202b will become taut as the store 204 drops away. As the store 204 drops away, the gag rod wire 232 will be removed from the second input 234 of the fuze system 216. FIG. 7b shows the example of a failed jettison event in which the safety connector 228b of the second attachment system 202b has become taut. In this scenario, the load path of the store 204 to the ejector release unit 206 will be through the first frangible connector 224b of the second attachment system 202b. This causes the first frangible connector 224b of the second attachment system 202b to break as the weight of the store 204 is higher than the breaking strength of the first frangible connector 224b. As such, the store 204 will be released from the ejector release unit 206 without the first input 214 of the fuze system 216 being activated. Therefore, even in the failed jettison event, the store 204 is not activated and the store is released in a safe condition. The arming apparatus 200 provides a mechanism for connecting two arming units 220a, 220b and provides an automated protection system, such that if one arming unit 220a, 220b fails during a jettison event, the store 204 will still be released in an unarmed condition.

The starting condition is shown initially in FIG. 2a or 2b. As per the normal jettison sequence, in a failed jettison event neither of the arming units 220a, 220b are energised. However, one of the arming units, may become in a locked state such that it acts as if it has been energised and has a relatively high pull-out force of the first frangible connector 224b from the second arming unit 220b. In one example, the arming unit 220a, 220b may become locked due to internal wear of components that creates dust that jams the internal mechanism of the arming units 220a, 220b.

Figure 8A:
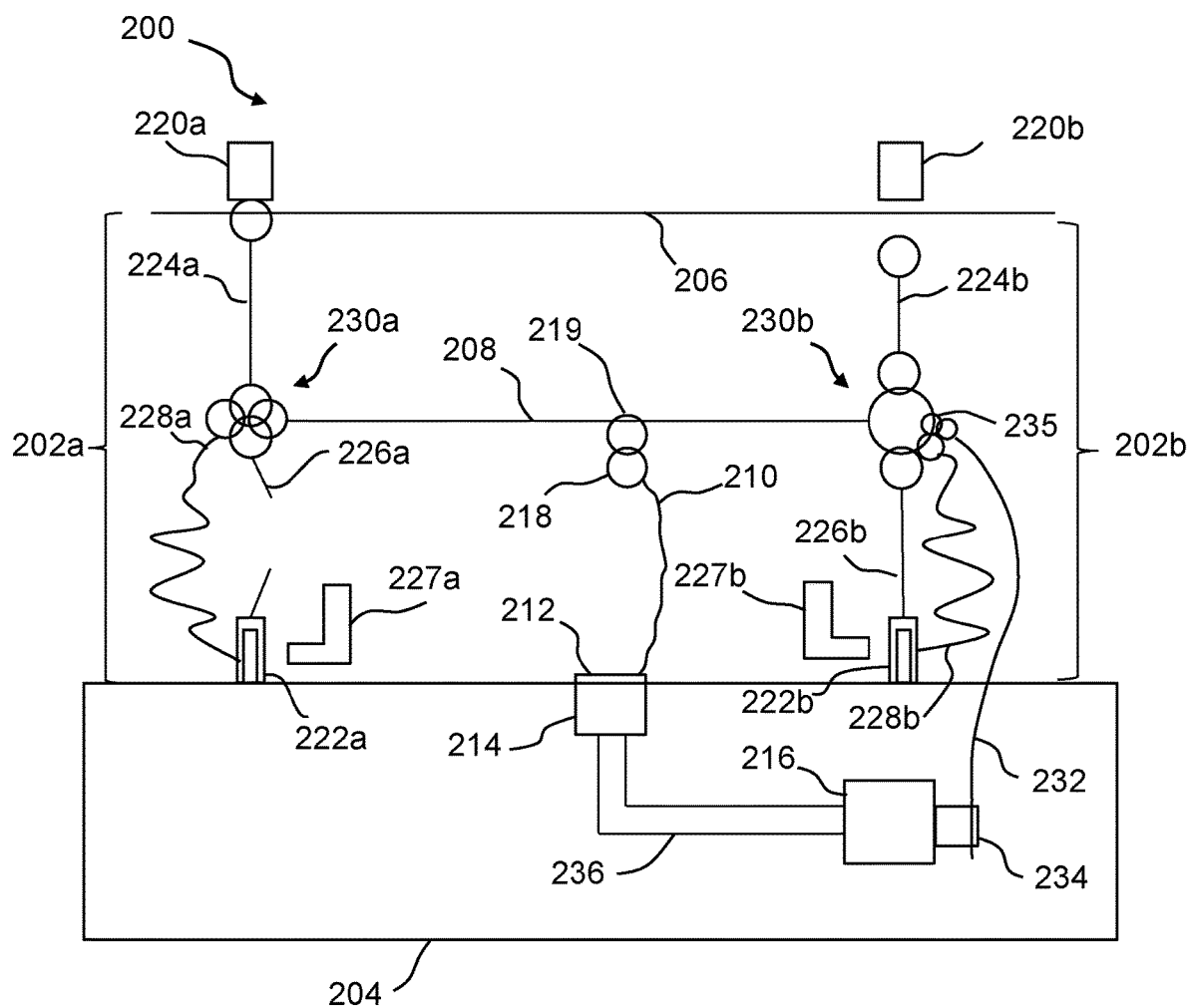
FIG. 8a shows an example of the first stage of a release of a store from an ejector release unit during a failed jettison release in a second example.

FIG. 8a shows the first stage of a failed jettison event in which the first arming unit 220a has failed and is in a locked state. Following the release of the store 204 from the ejector release unit suspension hooks 227a, 227b, the weight of the store 204 is transferred to the ejector release unit 206 via the first attachment system 202a and the second attachment system 202b. In this example, in the second attachment system 202b, the first frangible connector 224b is released from the second arming unit 220b as per the standard jettison event. However, in the first attachment system 202a, the first frangible connector 224a is locked in the first arming unit 220a and so isn't released as intended.

The linking connector 208 may begin to pivot or rotate as the second attachment system 202b separates downwards away from the second arming unit 220b. The next weakest element is the second frangible connector 226a and the load path from store 204 to the ejector release unit 206 will pass through the first attachment system 202a, which causes the second frangible connector 226a to break.

Figure 8B:
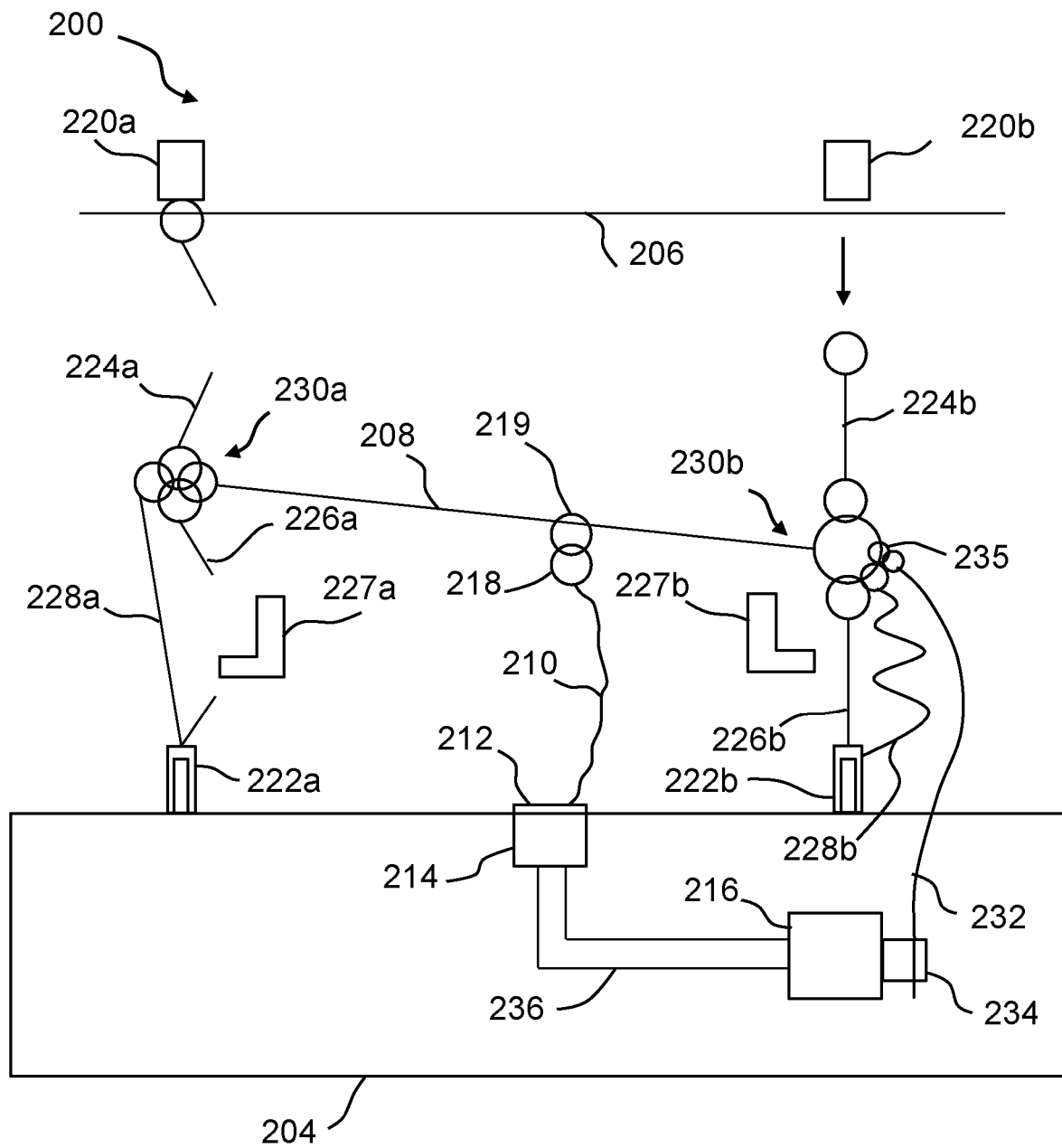
FIG. 8b shows an example of the second stage of a release of a store from an ejector release unit during a failed jettison release in a second example.

The next stage of the failed jettison event is that the safety connector 228a of the first attachment system 202a will become taut as the store 204 drops away. In this example, as the store 204 drops away, the gag rod wire 232 may not be removed from the second input 234 of the fuze system 216. FIG. 8b shows the example of a failed jettison event in which the safety connector 228a of the first attachment system 202a has become taut. In this scenario, the load path of the store 204 to the ejector release unit 206 will be through the first frangible connector 224a of the first attachment system 202a. This causes the first frangible connector 224a of the first attachment system 202a to break as the weight of the store 204 is higher than the breaking strength of the first frangible connector 224a. As such, the store 204 will be released from the ejector release unit 206 without either the first input 214 of the fuze system 216 or the second input 234 of the fuze system 216 being activated. Therefore, even in the failed jettison event, the store 204 is not activated and the store is released in a safe condition. The arming apparatus 200 is configured to connect two arming units 220a, 220b and provides an automated protection system, such that if one arming unit 220a, 220b fails during a jettison event, the store 204 will still be released in an unarmed condition.

The provision of this arming apparatus 200 removes the need for excessively long lengths of arming wires and lanyards, which could become trapped and damaged during installation or inadvertently operated by ground crew during weapon loading. Further, the requirement for speed tape is significantly reduced. The simplified cable routing allows for rapid assembly and it reduces the chance of operator errors. Further, the fusing system 216 can be premade away from the aircraft in a controlled factory environment thus reducing the possibility of lanyard system assembly errors. The arming apparatus 200 is configured such that all the connectors fall away with the store 204 during a release.

The apparatus provides an indication of what event has occurred, e.g, whether the store 204 has been released as a live release, a jettison or a failed jettison event.

When a store 204 is released as a live release, the top portion of the first shear wire 224a and 224b is retained in the arming units 220a and 220b as shown in FIG. 6.

In contrast, in the event of a correct jettison event, as shown in FIG. 3, both of the first shear wires 224a and 224b are released in their entirety together with the store 204.

In the event of a failed jettison event, which would indicate the one of the arming units 220a, 220b is not operated correctly, then in a post flight check, one of the tops of the shear wires 224a, 224b would have been retained in the respective arming units 220a, 220b, as shown in either FIG. 7b or FIG. 8b.

Figure 9:
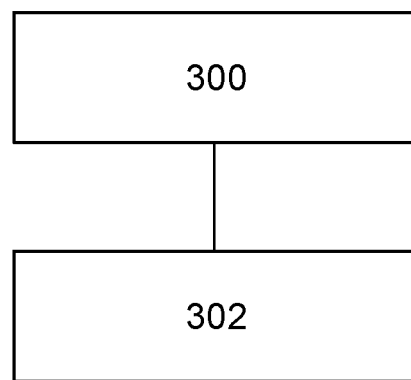
FIG. 9 shows an example of the process steps of a jettison release of a store from an ejector release unit in a second example.

FIG. 9 shows an example of a method of performing a jettison release according to one example. At step 300, the pilot initiates the release of the store 204 without energising the arming units 220a, 220b. At step 302, the first frangible connector of 224a, 224b is released from the arming unit 220a, 220b of each of the first attachment system 202a and second attachment system 202b to release the store 204 from the ejector release unit 206 in an unarmed state.

Figure 10:
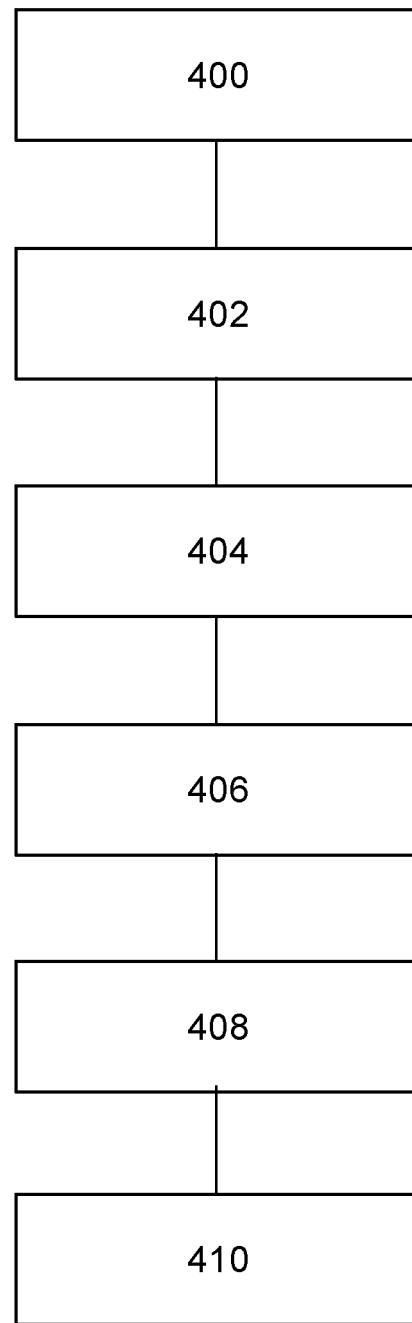
FIG. 10 shows an example of the process steps of a live release of a store from an ejector release unit.

FIG. 10 shows an example of a method of performing a live release according to one example. At step 400, the pilot energises the arming units 220a, 220b. At step 402, the store 204 is released from the ejector release unit suspension hooks.

At step 404, the second frangible connector 226a, 226b of each of the first and second attachment systems 202a, 202b breaks due to the weight of the store 204.

At step 406, the lid 212 of the first input 214 is opened due to the weight of the store 204 passing through the arming connector 210.

At step 408, the gag rod is released from the second input 234 of the fuze system 216.

At step 410, the first frangible connector 224a, 224b of the first and second attachment systems 202a, 202b breaks due to the weight of the store, thereby releasing the store 204 from the ejector release unit 206.

Figure 11:
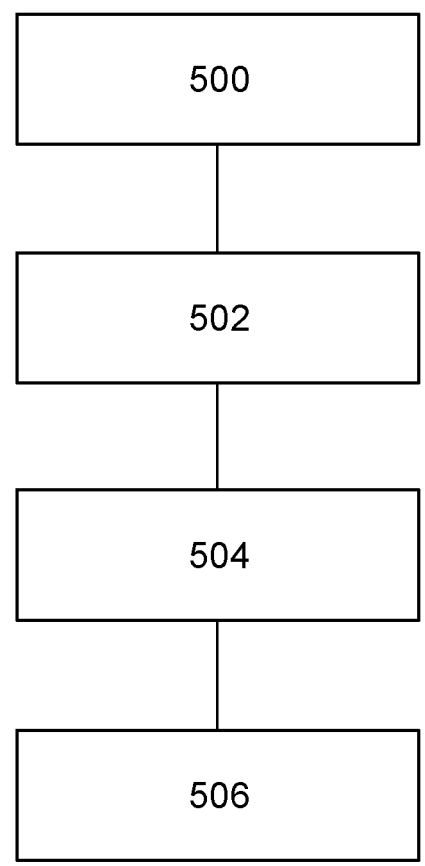
FIG. 11 shows an example of the process steps of a failed jettison release of a store from an ejector release unit.

FIG. 11 shows an example of a steps of a failed jettison event.

At step 500, the pilot initiates the release of the store 204 without energising the arming units 220a, 220b. However, one of the arming units 220 fails. In this example, it is the second arming unit 220b that fails, but in other examples, the first arming unit 220 may fail and the same process applies.

At step 502, the first frangible connector of 224a is released from the arming unit 220a of the first attachment system 202a, but the first frangible connector 224b is retained in the arming unit 220b of the second attachment system.

At step 504, the second frangible connector 226b of the second attachment system 202b breaks due to the weight of the store 204.

As step 506, the second safety connector 228b becomes taut and transfers the load to the first frangible connector 224b of the second attachment system 202b such that the first frangible connector 224b of the second attachment system 202b breaks due to the weight of the store 204, thereby releasing the store 204 from the ejector release unit 206.

Figure 12:
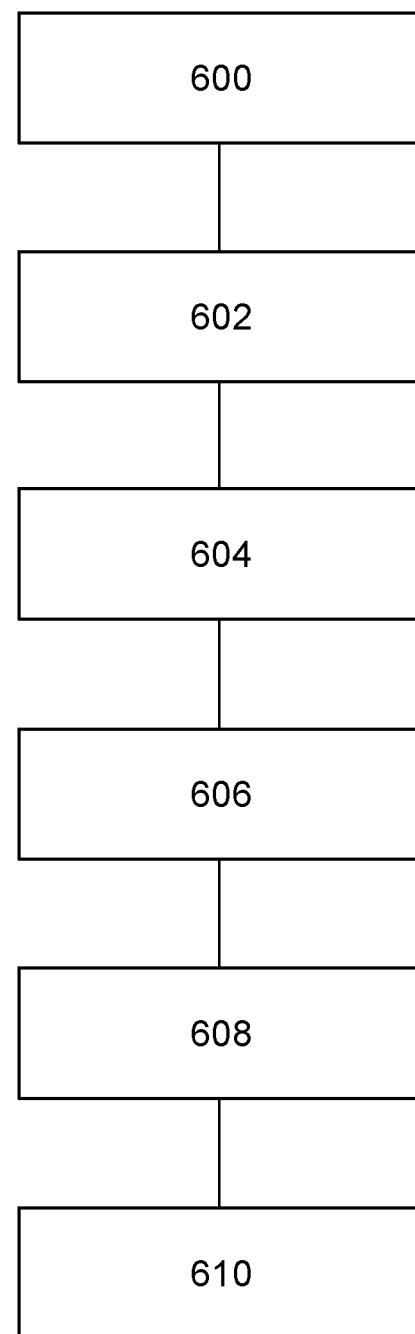
FIG. 12 shows an example of steps of installing the arming apparatus.

FIG. 12 shows an example of steps of installing the arming apparatus 200. At step 600, a user identifies first and second ends of the apparatus 200 based on the first coupling arrangement and the second coupling arrangement. The first end may be a forward end and the second end may be a rearward end of the apparatus 200.

The first coupling arrangement may be a direct coupling between the first frangible connector 224a and the second frangible connector 226a of the first attachment system, for example, as shown in FIG. 2e above. The second coupling arrangement may be an indirect connection between the first frangible connector 224b and the second frangible connector 226b of the second attachment system 202b. For example, there may be an intermediate coupler 231 between the first frangible connector 224b and the second frangible connector 226b of the second attachment system 202b. The difference in coupling arrangements enables a user to identify the correct orientation of the apparatus so that it is installed in the correct position.

At step 602, the first frangible connector 224a of the first attachment system 202a is coupled to said first arming unit.

At step 604, the second frangible connector 226a of the first attachment system 202a is coupled to a first lug of said store. For example, a clip 233 of the second frangible connector passes through a lug of the store 204 and connects to the second frangible connector between a first and second end.

At step 606, the first frangible connector 224b of the second attachment system 202b is coupled to said second arming unit.

At step 608, the second frangible connector 226b of the second attachment system 202b is coupled to a second lug of said store. For example, a clip 233 of the second frangible connector passes through a lug of the store 204 and connects to the second frangible connector between a first and second end.

At step 610, the arming clip 219 is coupled to said arming connector.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An arming apparatus for a store, the apparatus comprising:
    a first attachment system and a second attachment system;
    a linking connector coupled with the first attachment system and the second attachment system; and
    an arming clip coupled with the linking connector and for coupling with an arming connector of a first fuze input of said store;
    wherein each of the first attachment system and the second attachment system comprises:

an attachment for an arming unit;

a first frangible connector coupled with the arming unit and the linking connector; and a second frangible connector coupled with the linking connector and the store, wherein the linking connector is coupled to the first attachment system via a first coupling arrangement and is coupled to the second attachment system via a second coupling arrangement, wherein the first coupling arrangement and the second coupling arrangement have different structural configurations, and wherein each of the first coupling arrangement and the second coupling arrangement are manually secure.

2. The apparatus according to claim 1, wherein in the first coupling arrangement, the linking connector is directly coupled to the first attachment system.

3. The apparatus according to claim 1, wherein in the second coupling arrangement, the linking connector is coupled to the second attachment system via an intermediate coupler.

4. The apparatus according to claim 3, wherein the intermediate coupler comprises an intermediate ring.

5. The apparatus according to claim 1, comprising a gag rod wire coupled with the store and a second fuze input via the second attachment system.

6. The apparatus according to claim 1, wherein each attachment system comprises a safety connector coupled with the linking connector and the store.

7. The apparatus according to claim 6, wherein the length of the safety connector is longer than the length of the arming connector.

8. The apparatus according to claim 1, wherein one or more of the first frangible connector and the second frangible connector comprises a shear wire.

9. The apparatus according to claim 1, wherein the first frangible connector has a higher breaking force compared with a breaking force of the second frangible connector.

10. The apparatus according to claim 1, wherein the arming unit of each of the first attachment system and the second attachment system comprises an arming solenoid, wherein the arming solenoid has a first attachment force for the first frangible connector when the arming unit is energised and a second attachment force for the first frangible connector when the arming unit solenoid is unenergised.

11. The apparatus according to claim 10, wherein the first attachment force is lower than the breaking force of the second frangible connector.

12. The apparatus according to claim 10, wherein upon activation of the ejector release unit while each arming unit is energised, the second frangible connectors of the first and second attachment systems are configured to break under the weight of the store, such that the load from the store is transferred to an ejector release unit via the arming connector thereby activating the first fuze input of a fuze system.

13. The apparatus according to claim 12, wherein the first frangible connector of the first and second attachment systems is configured to break following activation of the first input due to the weight of the store.

14. A method of operating an arming apparatus, said arming apparatus configured according to claim 1, the method comprising:

energising a first said arming unit and a second said arming unit; and releasing the store from hooks of an ejector release unit.

15. A method of installing an arming apparatus, said arming apparatus configured according to claim 1 comprising:

identifying first and second ends of the apparatus based on the first coupling arrangement and the second coupling arrangement coupling the first frangible connector of the first attachment system to said first arming unit, coupling the second frangible connector of the first attachment system to a first lug of said store;

coupling the first frangible connector of the second attachment system to said second arming unit, coupling the second frangible connector of the second attachment system to a second lug of said store; and coupling the arming clip to said arming connector.

* * * * *